United States Patent
Morikawa et al.

(10) Patent No.: US 9,075,555 B2
(45) Date of Patent: Jul. 7, 2015

(54) PRINT SYSTEM, IMAGE FORMING APPARATUS, COORDINATION METHOD UPON PRINTING, AND NON-TRANSITORY COMPUTER-READABLE RECORDING MEDIUM ENCODED WITH COORDINATION PROGRAM UPON PRINTING

(71) Applicant: Konica Minolta, Inc., Chiyoda-ku (JP)

(72) Inventors: Takeshi Morikawa, Takarazuka (JP); Katsuhiko Akita, Amagasaki (JP); Daisuke Nakano, Kobe (JP); Kazusei Takahashi, Nishinomiya (JP); Yuji Okamoto, Nishinomiya (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/026,148

(22) Filed: Sep. 13, 2013

(65) Prior Publication Data

US 2014/0078538 A1 Mar. 20, 2014

(30) Foreign Application Priority Data

Sep. 15, 2012 (JP) ................................. 2012-203728

(51) Int. Cl.
G06F 3/12 (2006.01)
H04N 1/00 (2006.01)
G06F 9/44 (2006.01)

(52) U.S. Cl.
CPC .......... *G06F 3/1293* (2013.01); *H04N 1/00233* (2013.01); *H04N 1/00408* (2013.01); *H04N1/00973* (2013.01); *H04N 2201/0094* (2013.01); *G06F 3/1222* (2013.01); *G06F 3/1238* (2013.01); *G06F 3/1258* (2013.01); *G06F 3/1267* (2013.01); *G06F 3/1285* (2013.01); *G06F 9/4445* (2013.01)

(58) Field of Classification Search
USPC ........................................ 358/1.13, 1.15, 1.1
See application file for complete search history.

(56) References Cited

U.S. PATENT DOCUMENTS

| 7,034,954 B1 * | 4/2006 | Utsunomiya ................. 358/1.16 |
| 2003/0167307 A1 * | 9/2003 | Filepp et al. .................. 709/205 |
| 2010/0058194 A1 | 3/2010 | Owen |

FOREIGN PATENT DOCUMENTS

| JP | 2005-123826 A | 5/2005 |
| JP | 2007-304881 A | 11/2007 |

(Continued)

OTHER PUBLICATIONS

Japanese Office Action issued Oct. 21, 2014, by the Japan Patent Office, in corresponding Japanese Patent Application No. 2012-203728 with English translation (5 pages).

*Primary Examiner* — Martin Mushambo
(74) *Attorney, Agent, or Firm* — Buchanan Ingersoll & Rooney PC

(57) ABSTRACT

An information processing apparatus includes an application execution portion to generate application data, a print command portion to transmit a print command, a related information storage portion to store related information related to the application data, and a distant control portion, and the image forming apparatus includes an image forming control portion to form an image of print data included in the print command, and a remote control operation portion, and the remote control operation portion includes a remote control operation transmission portion to transmit to the information processing apparatus a remote control operation command, and a screen display control portion to display a remote control operation screen received from the information processing apparatus, and the distant control portion includes a screen generating portion to generate a remote control operation screen based on the related information associated with the application identification information included in the remote control operation command.

16 Claims, 13 Drawing Sheets

(56) References Cited

FOREIGN PATENT DOCUMENTS

| JP | 2008-132671 A | 6/2008 |
| JP | 2008-270972 A | 11/2008 |
| JP | 2010-028611 A | 2/2010 |
| JP | 2010-55609 A | 3/2010 |

\* cited by examiner

PRINT SYSTEM, IMAGE FORMING APPARATUS, COORDINATION METHOD UPON PRINTING, AND NON-TRANSITORY COMPUTER-READABLE RECORDING MEDIUM ENCODED WITH COORDINATION PROGRAM UPON PRINTING

This application is based on Japanese Patent Application No. 2012-203728 filed with Japan Patent Office on Sep. 15, 2012, the entire content of which is hereby incorporated by reference.

BACKGROUND OF THE INVENTION

1. Field of the Invention

The present invention relates to a print system, an image forming apparatus, a coordination method upon printing, and a non-transitory computer-readable recording medium encoded with a coordination program upon printing, and more specifically to a print system including an information processing apparatus and an image forming apparatus to form an image of print data from the information processing apparatus, the image forming apparatus, and a non-transitory computer-readable recording medium encoded with a coordination program upon printing and a coordination method upon printing executed in the image forming apparatus.

2. Description of the Related Art

A print system is known in which, instead of having an image forming apparatus as represented by a multi function peripheral immediately print the print data transmitted from a personal computer (hereinafter referred to as a "PC"), print data is first stored in the image forming apparatus and then printed by the image forming apparatus at the time a user logs into the image forming apparatus and so on.

In this print system, the printing is started after the user logs in at the image forming apparatus so that the user must wait until the printing of the print data by the image forming apparatus is completed.

Japanese Patent Laid-Open No. 2010-28611 describes an image forming apparatus which includes a card reader that communicates by wireless with an IC card storing identification information for specifying a user, a display portion, a storage portion storing one or more pieces of advertisement information, and a control portion to control the operation of the apparatus and which authenticates the identification information of the IC card and thereafter displays the advertisement information before displaying a screen to wait for an instruction of image forming.

The image forming apparatus of the above-described literature, however, gives the advertisement information to the user in a one-sided manner so that the user inevitably sees the advertisement information every time the user prints, and there is a problem that the user cannot effectively utilize the waiting time between the start and the end of the image forming.

SUMMARY OF THE INVENTION

According to one aspect of the present invention, a print system includes an image forming apparatus and an information processing apparatus, wherein the information processing apparatus includes an application execution portion to generate application data by executing an application program, a print command portion to transmit to the image forming apparatus a print command including application identification information for identifying the application data and print data converted from the application data in order to cause the image forming apparatus to form an image of the application data generated, by executing a driver program for controlling the image forming apparatus, a related information storage portion to store related information related to the application data in association with the application data at a stage where the print data is transmitted by the print command portion, and a distant control portion operated by remote control by the image forming apparatus that has transmitted the application data, and wherein the image forming apparatus includes a print command reception portion to receive the print command from the information processing apparatus, a temporary storage portion temporarily to store a set of application identification information and print data included in the print command received, an operation accepting portion to accept an operation by a user, an extracting portion to extract print data to be an object of processing from the print data stored temporarily based on the operation accepted, an image forming control portion to form an image of the print data extracted, and a remote control operation portion to operate by remote control the information processing apparatus that has transmitted the print data in response to the forming of the image of the print data, wherein the remote control operation portion includes a remote control operation transmission portion to transmit to the information processing apparatus a remote control operation command including application identification information which forms a set with the print data, and a screen display control portion to display a remote control operation screen received from the information processing apparatus in response to the transmission of the remote control operation command, and wherein the distant control portion includes a screen generating portion to generate a remote control operation screen based on the related information associated with the application identification information included in the remote control operation command, in response to the remote control operation command being received from the image forming apparatus, and a screen transmission portion to transmit the remote control operation screen to the image forming apparatus.

According to another aspect of the present invention, an image forming apparatus is controlled by an information processing apparatus and includes a print command reception portion to receive a print command including application identification information for identifying application data generated by the information processing apparatus executing an application program and print data for forming an image of the application data, a temporary storage portion temporarily to store a set of application identification information and print data included in the print command received, an operation accepting portion to accept an operation by a user, an extracting portion to extract print data to be an object of processing from the print data stored temporarily, based on the operation accepted, an image forming control portion to form an image of the print data extracted, and a remote control operation portion to operate by remote control the information processing apparatus that has transmitted the print data in response to the forming of the image of the print data, wherein the remote control operation portion includes a remote control operation transmission portion to transmit to the information processing apparatus a remote control operation command including application identification information which forms a set with the print data, and a screen display control portion to display a remote control operation screen which is received from the information processing apparatus in response to the transmission of the remote control operation command and which the information processing apparatus generates in relation to application data of the application identification information included in the remote control operation command.

According to a further aspect of the present invention, a coordination method upon printing is executed by an image forming apparatus controlled by an information processing apparatus and includes a print command receiving step to receive a print command including application identification information for identifying application data generated by the information processing apparatus executing an application program and print data for forming an image of the application data, a temporarily storing step temporarily to store a set of application identification information and print data included in the print command received, an operation accepting step to accept an operation by a user, an extracting step to extract print data to be an object of processing from the print data stored temporarily, based on the operation accepted in the operation accepting step, an image forming control step to form an image of the print data extracted, and a remote control operation step to operate by remote control the information processing apparatus that has transmitted the print data in response to the forming of the image of the print data, wherein the remote control operation step includes a remote control operation transmitting step to transmit to the information processing apparatus a remote control operation command including application identification information which forms a set with the print data, and a screen display control step to display a remote control operation screen which is received from the information processing apparatus in response to the transmission of the remote control operation command and which the information processing apparatus generates in relation to application data of the application identification information included in the remote control operation command.

According to a still other aspect of the present invention, a non-transitory computer-readable recording medium is encoded with a coordination program upon printing which is executed by a computer controlling an image forming apparatus controlled by an information processing apparatus, and causes the computer to execute a print command receiving step to receive a print command including application identification information for identifying application data generated by the computer executing an application program and print data for forming an image of the application data, a temporarily storing step temporarily to store a set of application identification information and print data included in the print command received, an operation accepting step to accept an operation by a user, an extracting step to extract print data to be an object of processing from the print data stored temporarily, based on the operation accepted in the operation accepting step, an image forming control step to form an image of the print data extracted, and a remote control operation step to operate by remote control the information processing apparatus that has transmitted the print data in response to the forming of the image of the print data, wherein the remote control operation step includes a remote control operation transmitting step to transmit to the information processing apparatus a remote control operation command including application identification information which forms a set with the print data, and a screen display control step to display a remote control operation screen which is received from the information processing apparatus in response to the transmission of the remote control operation command and which the information processing apparatus generates in relation to application data of the application identification information included in the remote control operation command.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Figure 1:
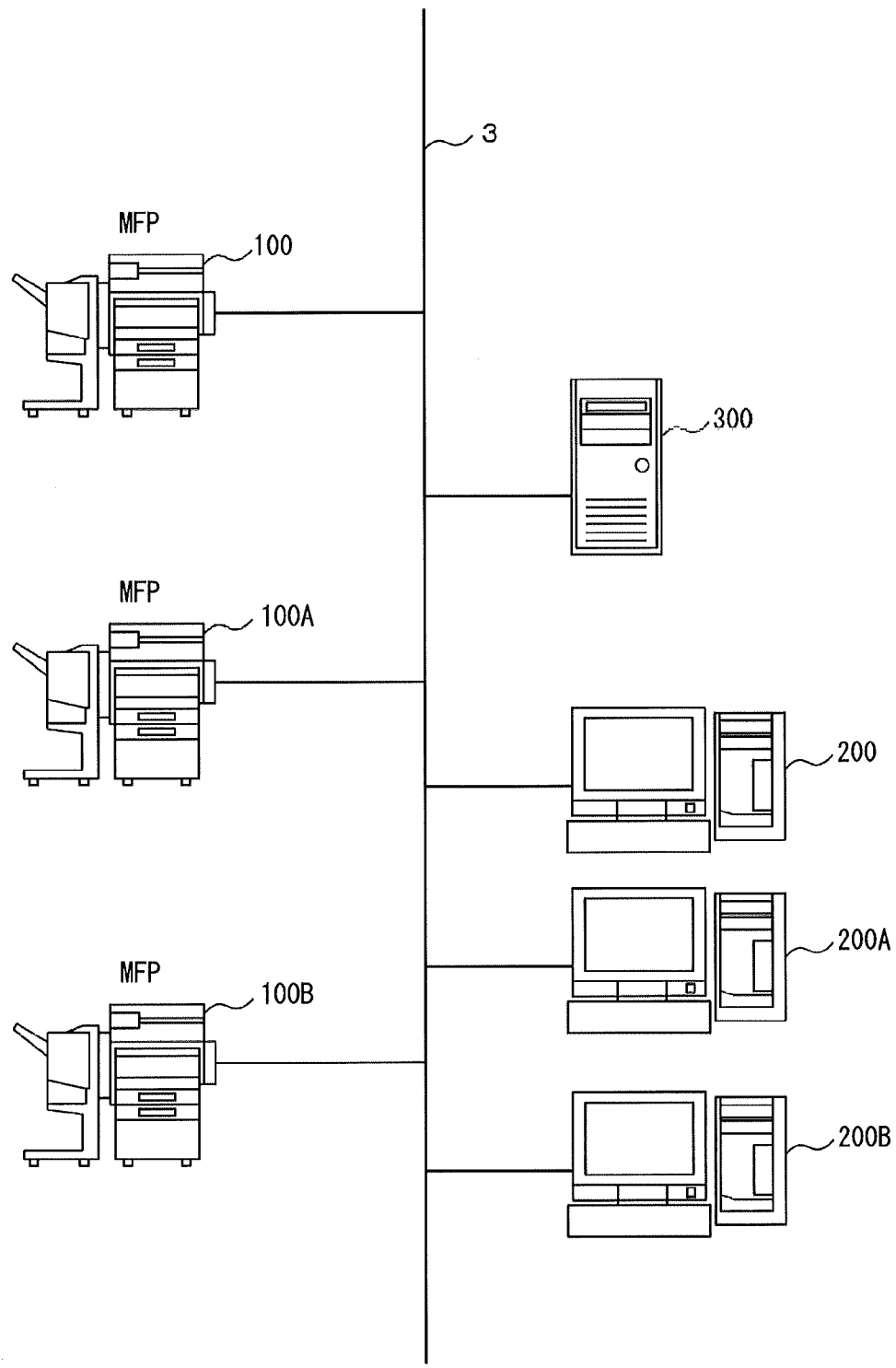
FIG. 1 is an overall schematic diagram of a print system according to an embodiment of the present invention.

The embodiments of the present invention will be described below with reference to the drawings. In the following description, the same parts are denoted by the same reference characters. Their names and function are also the same. Thus, the detailed description thereof will not be repeated.

FIG. 1 is an overall schematic diagram of a print system according to an embodiment of the present invention. With reference to FIG. 1, a print system 1 includes multi function peripherals (hereinafter referred to as MFPs) 100, 100A, and 100B as image forming apparatuses, personal computers (hereinafter referred to as "PCs") 200, 200A, and 200B, and an authentication server 300, respectively connected to a network 3. Moreover, although the drawing shows the example in which three MFPs (Multi Function Peripherals) 100, 100A, and 100B are connected to network 3, the number of MFPs is not limited to this, and it may be one or more. In addition, instead of MFPs 100, 100A, and 100B, a device provided with the function to form an image such as a facsimile machine and a printer may be used. Network 3 is a local area network (LAN) and the form of connection may be by cable or wireless. Furthermore, network 3 is not limited to the LAN and may be a wide area network (WAN), Public Switched Telephone Networks (PSTN), the Internet and the like.

PCs 200, 200A, and 200B, and authentication server 300 are common computers. Authentication server 300 executes a process to authenticate a user using PCs 200, 200A, and 200B and MFPs 100, 100A, and 100B. Authentication server 300 stores user data including authentication information and user identification information for identifying a user, and when receiving from one of PCs 200, 200A, and 200B and MFPs 100, 100A, and 100B the authentication information and the user identification information inputted thereinto by the user, authentication server 300 compares the authentication information and the user identification information received with the user data stored in advance. Authentication server 300 transmits back an authentication result indicating an authentication success if they match, and transmits back the authentication result indicating an authentication failure if they do not match.

Moreover, although the example using a password as the authentication information is shown, biological information such as an iris, a vein pattern, and a finger print of a user may be used to authenticate. In such a case, a scanning device for scanning the biological information is connected to MFPs 100, 100A, and 100B and PCs 200, 200A, and 200B, and the user data stored in authentication server 300 includes the user identification information and the biological information. Then, the biological information scanned by the scanning device is inputted into each of MFPs 100, 100A, and 100B and PCs 200, 200A, and 200B. MFPs 100, 100A, and 100B and PCs 200, 200A, and 200B each transmit the biological information inputted from the scanning device to authentication server 300 and cause authentication server 300 to authenticate.

Moreover, there are cases where each of PCs 200, 200A, and 200B and MFPs 100, 100A, and 100B serves also as authentication server 300, and authentication server 300 is not required in such cases.

PCs 200, 200A, and 200B each are used by a user and execute an application program so as to execute a variety of processes. A variety of processes include a log-in process to authenticate the user who is using, a process to edit a document, a process to transmit and receive electronic mail, a spreadsheet process, a process to edit an image, and a print process to generate print data and to cause one of MFPs 100, 100A, and 100B to print. Moreover, these processes are only given as an example, and are not limited to these. It may be a process that is executed by PCs 200, 200A, and 200B where an application program is installed in PCs 200, 200A, and 200B.

In print system 1 according to the present embodiment, PCs 200, 200A, and 200B each have a printer driver program installed for causing MFPs 100, 100A, and 100B to form an image of print data. PCs 200, 200A, and 200B each execute the printer driver program so as to cause one of MFPs 100, 100A, and 100B to store the print data temporarily.

In addition, there are cases where print conditions such as the number of sheets of image to be formed, the size of a sheet of paper, the distinction between color and black-and-white, and a print layout are transmitted from one of PCs 200, 200A, and 200B along with the print data. These print conditions are determined by PCs 200, 200A, and 200B based on a value accepted from the user. Moreover, PCs 200, 200A, and 200B may transmit the print data alone without transmitting a print condition along with the print data, and the user may designate the print condition at the MFP operated by the user among MFPs 100, 100A, and 100B.

MFPs 100, 100A, and 100B may have identical or different hardware arrangements but are at least provided with an image forming portion for forming an image on a sheet such as paper based on image data. While there are cases where the hardware arrangements of MFPs 100, 100A, and 100B are not identical, the example will be described here in which MPF 100 has the arrangement that at least one of other MFPs 100A and 100B has.

Figure 2:
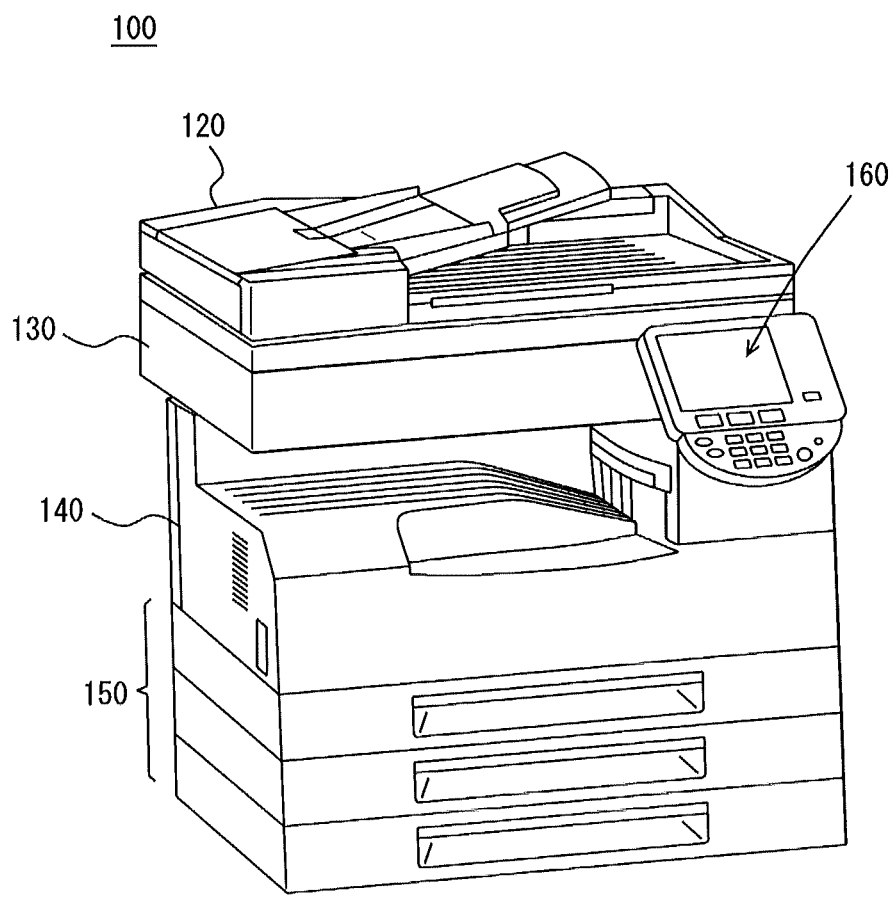
FIG. 2 is a perspective view illustrating the external appearance of an MFP (Multi Function Peripheral) according to one of the present embodiments.

FIG. 2 is a perspective view illustrating the external appearance of an MFP according to one embodiment of the present invention. With reference to FIG. 2, MFP 100 includes an original document scanning portion 130 to scan a sheet of original document, an automatic document feeder 120 to feed a sheet of original document to original document scanning portion 130, an image forming portion 140 to form an image on a sheet of paper and the like based on image data outputted by original document scanning portion 130 after it scans the sheet of the original document, a paper feeding portion 150 to supply a sheet of paper to image forming portion 140, and an operation panel 160 serving as a user interface.

Automatic document feeder 120 automatically feeds a plurality of sheets of original documents being set on an original document paper feed tray one sheet at a time to a prescribed original document scanning position set on a platen glass of original document scanning portion 130, and discharges the sheet of original document onto an original document paper discharge tray after the original document image has been scanned by original document scanning portion 130. Original document scanning portion 130 includes a light source for irradiating light on the sheet of original document conveyed to the original document scanning position and a photoelectric transducer for receiving the light reflected from the sheet of original document, and scans an original document image corresponding to the size of the sheet of original document. The photoelectric transducer converts the received light into image data as an electrical signal and outputs it to image forming portion 140. Paper feeding portion 150 conveys a sheet of paper stored in the paper feed tray to image forming portion 140.

Image forming portion 140 forms an image by a well-known electrophotographic method, and forms the image on the sheet of paper conveyed by paper feeding portion 150 based on image data after data processing obtained by applying a variety of data processing such as shading correction to the image data inputted from original document scanning portion 130 or based on image data received from outside.

Figure 3:
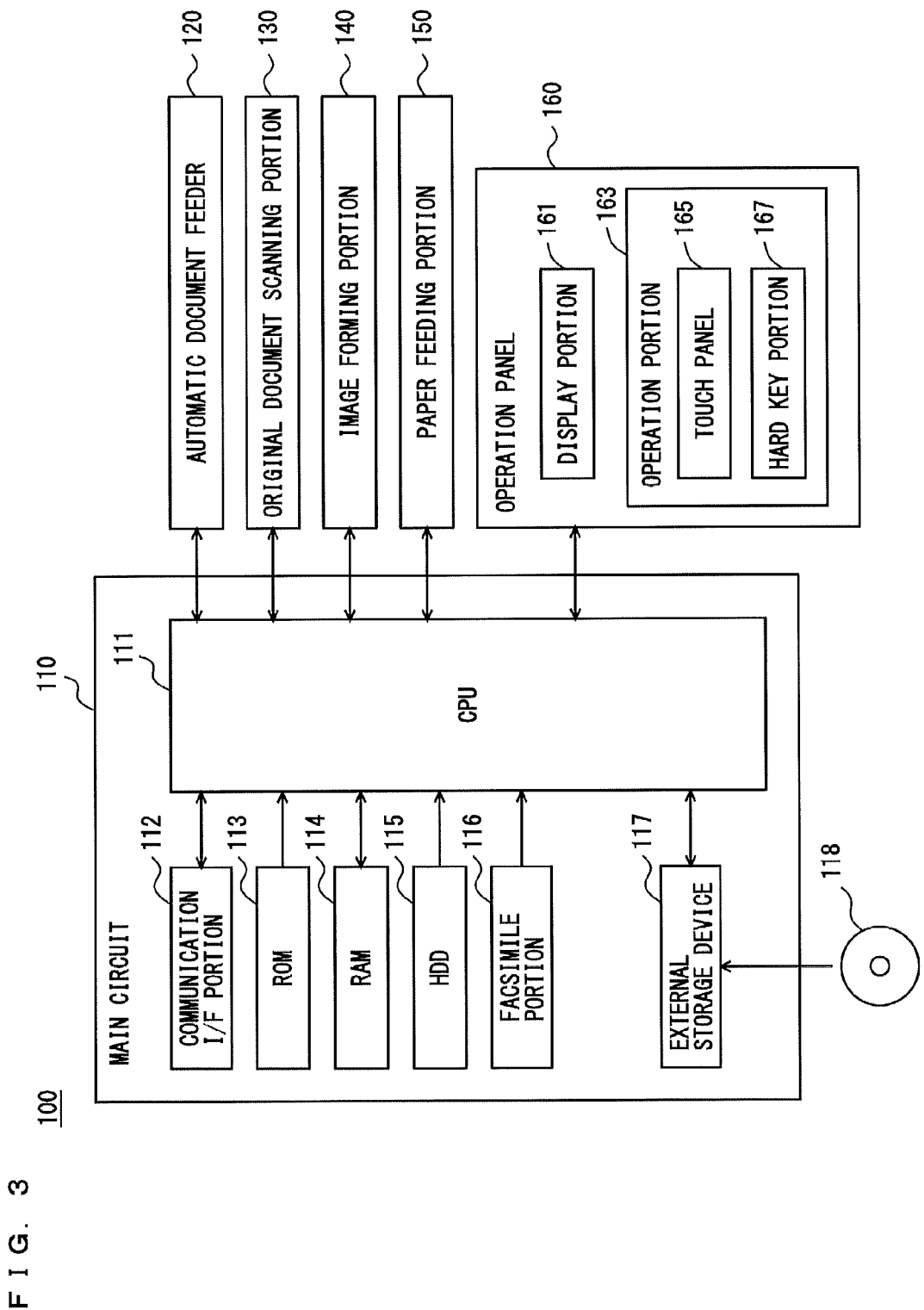
FIG. 3 is a schematic block diagram showing one example of a hardware arrangement of the MFP.

FIG. 3 is a schematic block diagram showing one example of a hardware arrangement of the MFP. With reference to FIG. 3, MFP 100 includes a main circuit 110. Main circuit 110 includes a CPU 111, a communication interface (I/F) portion 112, a ROM (Read Only Memory) 113, a RAM (Random Access Memory) 114, a hard disk drive (HDD) 115 serving as a mass storage device, a facsimile portion 116, and an external storage device 117. CPU 111 is connected to automatic document feeder 120, original document scanning portion 130, image forming portion 140, paper feeding portion 150, and operation panel 160 and controls the entire MFP 100.

ROM 113 stores a program to be executed by CPU 111 or the data necessary for execution of that program. RAM 114 is used as a work area when CPU 111 executes a program. In addition, RAM 114 temporarily stores the scanned image sent continuously from original document scanning portion 130.

Facsimile portion 116 is connected to Public Switched Telephone Networks (PSTN) and transmits facsimile data to or receives facsimile data from the PSTN. Facsimile portion 116 stores the received facsimile data in HDD 115 or converts the received facsimile data into print data that can be printed in image forming portion 140 and outputs the print data to image forming portion 140. Consequently, image forming portion 140 forms on a sheet of paper an image of the facsimile data received by facsimile portion 116. Moreover, facsimile portion 116 converts the data (the scanned image) outputted by original document scanning portion 130 after it scans a sheet of the original document or the data stored in HDD 115 into facsimile data and transmits the converted facsimile data to a facsimile device connected to the PSTN.

Communication I/F portion 112 is an interface for connecting MFP 100 to network 3. Communication I/F portion 112 communicates with other MFPs 100A and 100B and PCs 200, 200A, and 200B and authentication server 300 connected to network 3, using a communication protocol such as a TCP (Transmission Control Protocol) or an FTP (File Transfer Protocol). Moreover, the protocol for the communication is not particularly limited, and any protocol may be used. In addition, network 3 to which communication I/F portion 112 is connected is a local area network (LAN) and the form of connection may be by cable or wireless. Furthermore, network 3 is not limited to the LAN and may be a network using a wide area network (WAN), Public Switched Telephone Networks (PSTN) or the like. In addition, network 3 is connected to the Internet. Consequently, MFP 100 is capable of communicating with a computer such as a server connected to the Internet.

External storage device 117 is controlled by CPU 111 and has a CD-ROM (Compact Disk Read Only Memory) 118 or a semiconductor memory mounted thereto. CPU 111 is capable of accessing CD-ROM 118 or the semiconductor memory via external storage device 117. CPU 111 loads into RAM 114 a program stored in the semiconductor memory or in CD-ROM 118 mounted on external storage device 117 and executes it. Moreover, the program to be executed by CPU 111 is not limited to the program stored in CD-ROM 118, and a program stored in HDD 115 may be loaded into RAM 114 and be executed. In this case, another computer connected to network 3 may rewrite the program stored in HDD 115 of MFP 100 or it may additionally write in a new program via network 3 connected to communication I/F portion 112. Moreover, MFP 100 may download a program from another computer connected to the network and store this program in HDD 115. The program referred to here includes not only a program directly executable by CPU 111 but also a source program, a compressed program, an encrypted program, and the like.

In addition, the media for storing the program to be executed by CPU 111 is not limited to CD-ROM 118 and may also be an optical disk [MO (Magnetic Optical Disc)/MD (Mini Disc)/DVD (Digital Versatile Disc)], an IC card, an optical card, or a semiconductor memory such as a mask ROM, an EPROM (Erasable Programmable ROM), and an EEPROM (Electrically Erasable Programmable ROM).

Operation panel 160 includes a display portion 161 and an operation portion 163. Display portion 161 is a display such as a liquid crystal display (LCD) and an organic ELD (Electro-Luminescence Display), and displays an instruction menu for a user, information related to the image data obtained and so on. Operation portion 163 includes a touch panel 165 and a hard key portion 167 consisting of a plurality of keys. Each of a plurality of keys included in hard key portion 167 includes a contact switch and is connected to CPU 111. When pressed down by the user, a hard key closes the contact and thus closes a circuit connected to CPU 111. The hard key closes the circuit while it is being pressed down by the user operating MFP 100 and opens the circuit while not being pressed down by the user.

When a plurality of keys provided in hard key portion 167 are pressed, operation portion 163 accepts the input of data such as a number, a character, and an instruction corresponding to the pressed keys. Touch panel 165 is provided on a top surface or a bottom surface of display portion 161 and outputs the coordinates of the position pressed by the user to CPU 111. Touch panel 165 detects a position instructed by the user with a finger or a stylus pen and outputs the coordinates of the detected position to CPU 111. It is preferable that touch panel 165 is of a size equal to or greater than that of a display surface of display portion 161. Touch panel 165 is provided overlapping display portion 161 so that, when the user instructs on the display surface of display portion 161, touch panel 165 outputs to CPU 111 the coordinates of the position instructed by the user within the display surface of display portion 161. As touch panel 165, a resistive film type, a surface acoustic wave type, an infrared type, an electromagnetic induction type, and a capacitive type may be used, and the type is not limited.

Figure 4:
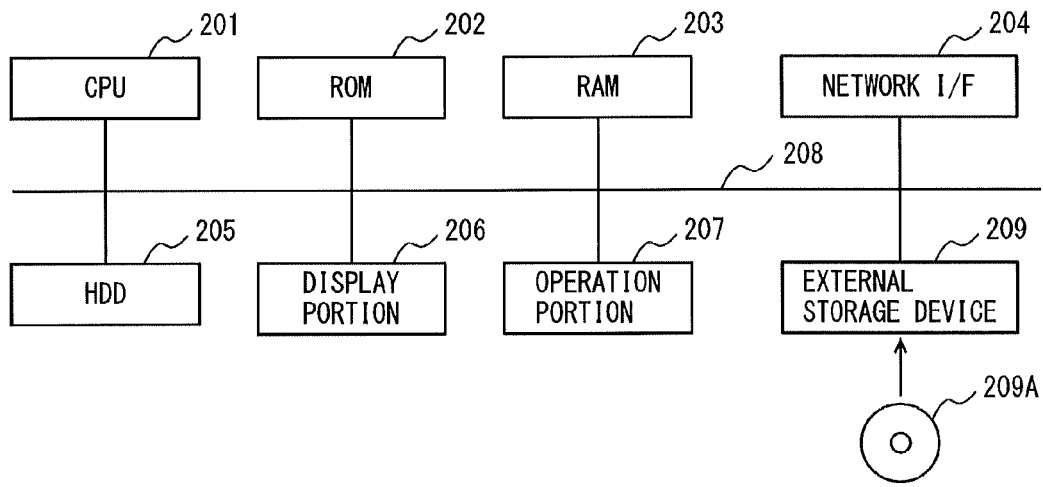
FIG. 4 is a block diagram showing one example of a hardware arrangement of a PC.

Since the hardware arrangements and the functions of PCs 200, 200A, and 200B are the same, PC 200 will be described as an example here. FIG. 4 is a block diagram showing one example of a hardware arrangement of a PC. With reference to FIG. 4, PC 200 includes a CPU 201 for controlling the entire PC 200, a ROM 202 for storing a program and the like to be executed by CPU 201, a RAM 203 used as a work area of CPU 201, a network interface (I/F) 204 for connecting PC 200 to a network, an HDD 205 serving as a mass storage device, a display portion 206, an operation portion 207 to accept the input of an operation by a user, and an external storage device 209, respectively connected to a bus 208.

External storage device 209 has a CD-ROM 209A storing a program mounted thereto. CPU 201 loads into RAM 203 the program stored in CD-ROM 209A via external storage device 209 and executes it. Moreover, the storage media for storing the program is not limited to CD-ROM 209A and may also be a flexible disk, a cassette tape, an optical disk (MO/MD/DVD), an IC card, an optical card, and a semiconductor memory such as a mask ROM, an EPROM, an EEPROM, and the like. In addition, the program stored in HDD 205 may be loaded into RAM 203 and be executed. In this case, PC 200 may download a program from another computer connected to network 3 and store this program in HDD 205. The program referred to here includes not only a program directly executable by CPU 201 but also a source program, a compressed program, an encrypted program, and the like.

Figure 5:
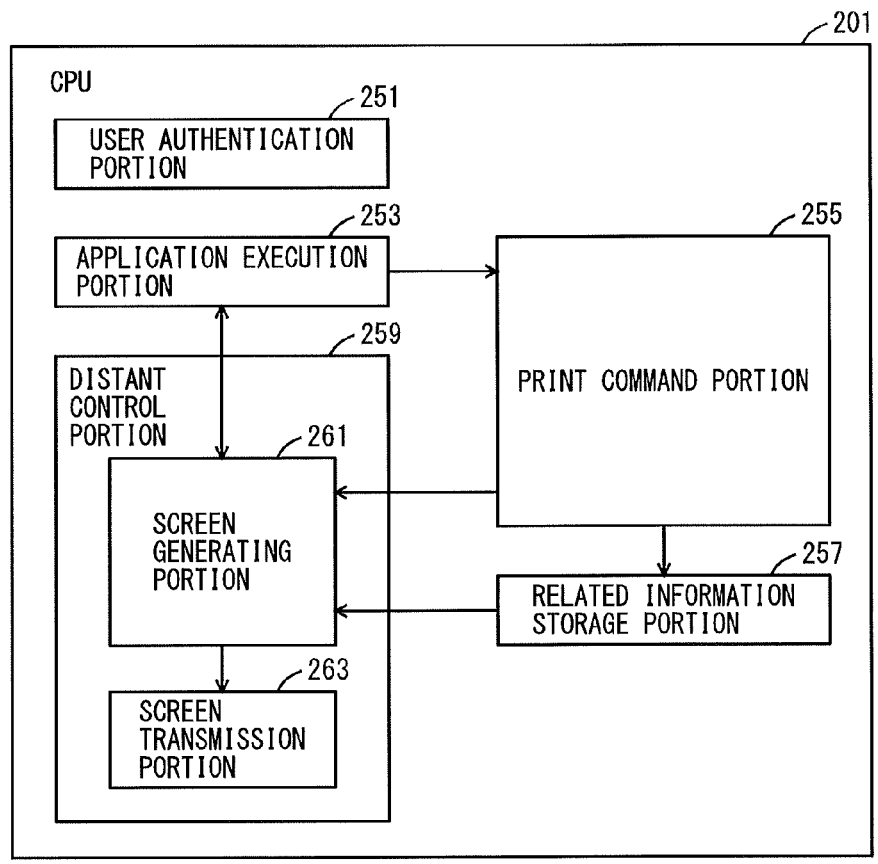
FIG. 5 is a block diagram showing one example of a function of a CPU (Central Processing Unit) provided in the PC.

FIG. 5 is a block diagram showing one example of a function of a CPU provided in the PC. The function of CPU 201 provided in PC 200 shown in FIG. 5 is a function formed in CPU 201 by CPU 201 executing an authentication program, an application program, and a printer driver program stored in ROM 202, HDD 205, or CD-ROM 209A.

With reference to FIG. 5, CPU 201 provided in PC 200 includes a user authentication portion 251 to authenticate the user operating PC 200, an application execution portion 253 to generate application data, a print command portion 255 to transmit a print command to one of MFPs 100, 100A, and 100B, a related information storage portion 257, and a distant control portion 259. User authentication portion 251 is formed by CPU 201 executing the authentication program. Application execution portion 253 is formed by CPU 201 executing the application program. Print command portion 255, related information storage portion 257, and distant control portion 259 are formed by CPU 201 executing the printer driver program.

User authentication portion 251 authenticates the user who is operating PC 200. More specifically, user authentication portion 251 displays a log-in screen on display portion 206. The log-in screen includes an area for inputting user identification information and an area for inputting a password. When the user inputs the user identification information and a password into operation portion 207, the user identification information and the password are accepted from operation portion 207, and authentication information including the user identification information and the password accepted is transmitted to authentication server 300 via network I/F 204, and authentication server 300 performs the authentication. The information of the transmission destination of the authentication information, or more specifically, apparatus identification information of authentication server 300, is set by the user and stored in HDD 205 at the stage when the authentication program is installed in PC 200.

When network I/F 204 receives an authentication result from authentication server 300, user authentication portion 251 accepts that authentication result. If the authentication result indicates an authentication success, user authentication portion 251 permits the log-in by the user and accepts the operation inputted into operation portion 207 as the operation by the user who has been authenticated and whose log-in has been permitted until a log-out instruction is subsequently inputted. If the authentication result indicates an authentication failure, user authentication portion 251 displays an error message on display portion 206 without permitting the log-in by the user.

Application execution portion 253 executes the process determined by the application program to be executed and generates application data. The application program includes, for instance, a text editing program that determines the process of editing a document, an electronic mail transmission and reception program that determines the process of transmitting and receiving electronic mail, a spreadsheet program that determines the process of spreadsheet, and an image editing program that determines the process of editing an image.

When the user inputs an operation to instruct printing into operation portion 207 while an application program is being executed, application execution portion 253 outputs to print command portion 255 the program identification information for identifying the application program being executed at that point and the application data being generated at that point. The application data generated by application execution portion 253 includes data to be an object of processing by application execution portion 253, and includes, for instance, the electronic mail to be the object of display in the case where a received electronic mail is being displayed.

To print command portion 255, the program identification information and the application data are inputted. Print command portion 255 displays a setting screen for setting a print condition on display portion 206 and accepts the print condition according to the operation the user inputs into the setting screen. The print condition includes a condition to specify a printing apparatus to print an image of the application data from among MFPs 100, 100A, and 100B. Here, the case where the user designates MFP 100 as the printing apparatus will be described as an example. Print command portion 255 converts the application data into print data that can be printed by MFP 100 designated to be the printing apparatus, and transmits a print command to MFP 100 serving as the printing apparatus via network I/F 204. The print command includes the user identification information of the user authenticated by user authentication portion 251, the print data, the print condition, and the application identification information for identifying the application data.

In addition, in response to the transmission of the print command, print command portion 255 outputs the application identification information, the program identification information, and the apparatus identification information for identifying MFP 100 serving as the printing apparatus, as a set, to related information storage portion 257 and outputs the apparatus identification information for identifying MFP 100 serving as the printing apparatus to distant control portion 259.

In response to the inputting of the set of the application identification information, the program identification information, and the apparatus identification information, related information storage portion 257 generates related information consisting of the set of the application identification information, the program identification information, and the apparatus identification information, and stores the related information in HDD 205. The related information associates the application data with the application program executed by application execution portion 253 that has generated that application data and with the printing apparatus to which the application data had been transmitted.

Distant control portion 259, by controlling Network I/F 204, receives a remote control operation command from the printing apparatus, among MFPs 100, 100A, and 100B, to which the print command was transmitted by print command portion 255, and executes a process according to the received remote control operation command. When network I/F 204 receives the remote control operation command from one of MFPs 100, 100A, and 100B, distant control portion 259 determines whether or not the apparatus that has transmitted the remote control operation command is the printing apparatus to which the print command was transmitted by print command portion 255. This is to determine that the user who has instructed the printing is the same as the user who operates PC 200 by remote control by operating MFP 100 serving as the printing apparatus.

More specifically, distant control portion 259 compares the apparatus identification information of the apparatus that has transmitted the remote control operation command with the apparatus identification information inputted from print command portion 255, and if they are identical, the apparatus that has transmitted the remote control operation command is determined to be the printing apparatus, but if they are not identical, the apparatus that has transmitted the remote control operation command is determined not to be the printing apparatus. Distant control portion 259 accepts the remote control operation command if the apparatus that has transmitted the remote control operation command is determined to be the printing apparatus, but it does not accept the remote control operation command if the apparatus that has transmitted the remote control operation command is determined not to be the printing apparatus.

Hereinafter, the case in which a remote control operation command is received from MFP 100 serving as a printing apparatus will be described as an example. The remote control operation command includes a remote control operation command specifying data to be an object of processing and a remote control operation command specifying the process. The remote control operation command that specifies data to be the object of processing includes application identification information included in the print command transmitted to MFP 100 serving as the printing apparatus. The remote control operation command that specifies the process includes operation identification information for identifying an operation corresponding to the process.

Distant control portion 259 includes a screen generating portion 261 and a screen transmission portion 263. When network I/F 204 receives the remote control operation command from MFP 100 serving as the printing apparatus, screen generating portion 261 determines whether the remote control operation command is the remote control operation command specifying data to be the object of processing or the remote control operation command specifying the process to be executed. When determining that the remote control operation command is the remote control operation command specifying data to be the object of processing, screen generating portion 261 reads the related information associated with the application identification information included in the received remote control operation command from HDD 205. More specifically, screen generating portion 261 reads the related information including the apparatus identification information of MFP 100 serving as the printing apparatus and the application identification information included in the remote control operation command received from MFP 100. Screen generating portion 261 causes application execution portion 253 to execute the application program specified by the program identification information included in the read related information to process the application data specified by the application identification information.

Application execution portion 253 executes the application program with the application data as an object of processing so as to generate and output a screen. Screen generating portion 261 sets the screen outputted by application execution portion 253 to be the remote control operation screen and outputs to screen transmission portion 263 the remote control operation screen and the apparatus identification information of MFP 100 serving as the printing device that has transmitted the remote control operation command.

Screen transmission portion 263 transmits the remote control operation screen via network I/F 204 to MFP 100 serving as the printing apparatus that has transmitted the remote control operation command. Although the details will be described later, in MFP 100 receiving the remote control operation screen, the remote control operation screen is displayed, allowing the user to input the operation for operating PC 200 by remote control according to the remote control operation screen. When the user inputs the operation for operating PC 200 by remote control according to the remote control operation screen, MFP 100 transmits the remote control operation command specifying the process. The remote control operation command in this case includes the operation identification information for identifying the operation inputted by the user into MFP 100.

In the case where screen generating portion 261 receives the remote control operation command specifying the process from MFP 100 serving as the printing apparatus, at this stage, application execution portion 253 has already executed the application program. Consequently, screen generating portion 261 outputs the operation identification information included in the received remote control operation command to application execution portion 253 and causes application execution portion 253 to execute the process corresponding to the operation specified by the operation identification information.

When the operation identification information is inputted from screen generating portion 261, application execution portion 253 executes the process corresponding to the operation specified by the operation identification information so as to generate and output a screen. Screen generating portion 261 sets the screen outputted by application execution portion 253 to be the remote control operation screen and outputs to screen transmission portion 263 the remote control operation screen and the apparatus identification information of MFP 100 serving as the printing apparatus that has transmitted the remote control operation command. Screen transmission portion 263 transmits the remote control operation screen via network I/F 204 to MFP 100 serving as the printing apparatus that has transmitted the remote control operation command.

Figure 6:
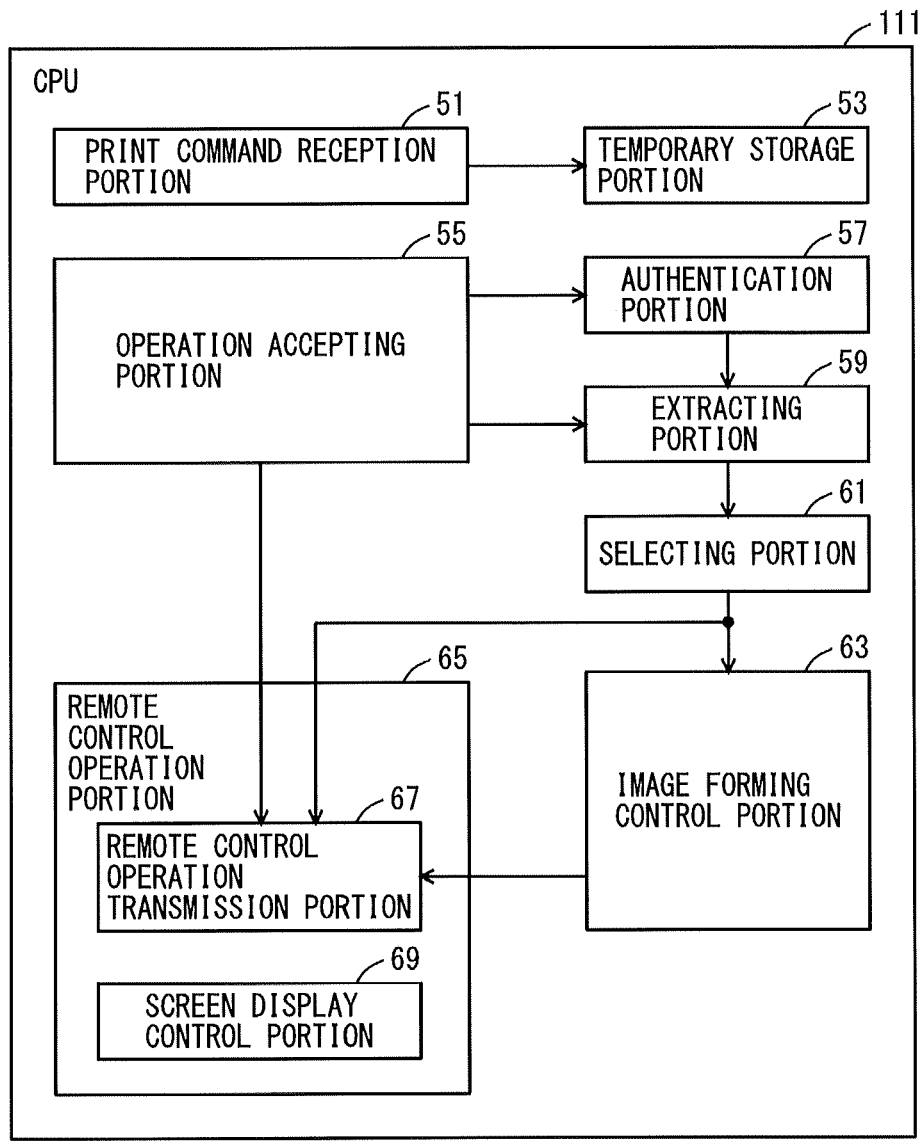
FIG. 6 is a block diagram showing one example of a function of a CPU provided in the MFP.

FIG. 6 is a block diagram showing one example of a function of a CPU provided in the MFP. The function shown in FIG. 6 is a function formed in CPU 111 when CPU 111 provided in MFP 100 executes a coordination program upon printing stored in ROM 113, HDD 115, or CD-ROM 118.

With reference to FIG. 6, CPU 111 provided in MFP 100 includes a print command reception portion 51 to receive a print command from one of PCs 200, 200A, and 200B, a temporary storage portion 53 to store the print command temporarily, an operation accepting portion 55 to accept an operation inputted by a user, an authentication portion 57 for authenticating the user, an extracting portion 59 to extract print data to be an object of image forming, a selecting portion 61 to select print data for image forming, an image forming control portion 63 to control image forming portion 140, and a remote control operation portion 65 to operate by remote control the apparatus to be an object of control that has transmitted the print command among PCs 200, 200A, and 200B.

Print command reception portion 51 controls communication I/F portion 112 and receives the print command from one of PCs 200, 200A, and 200B. Upon receiving the print command, print command reception portion 51 outputs to temporary storage portion 53 the received print command and the apparatus identification information for identifying the apparatus that has transmitted the print command among PCs 200, 200A, and 200B.

When the print command and the apparatus identification information are inputted from print command reception portion 51, temporary storage portion 53 stores the print command and the apparatus identification information as a set in HDD 115. The print command includes user identification information, print data, a print condition, and application identification information. Consequently, the set of the user identification information, the print data, the print condition, and the application identification information is stored in HDD 115 in association with the apparatus identification information.

Operation accepting portion 55 accepts the operation inputted into operation portion 163. Operation accepting portion 55 outputs the operation accepted at the stage where a log-in screen is being displayed on display portion 161 to authentication portion 57, outputs the operation accepted at the stage where a selection screen is being displayed on display portion 161 to selecting portion 61, and outputs the operation accepted at the stage where a remote control operation screen is being displayed on display portion 161 to remote control operation portion 65.

Authentication portion 57 authenticates the user who is operating operation panel 160. More specifically, authentication portion 57 displays a log-in screen on display portion 161. The log-in screen includes an area for inputting user identification information and an area for inputting a password. When the user inputs the user identification information and a password into operation portion 163, the user identification information and the password are accepted from operation portion 163, and authentication information including the user identification information and the password accepted is transmitted to authentication server 300 via communication I/F portion 112, and authentication server 300 performs the authentication. The information of the transmission destination of the authentication information, or more specifically, the apparatus identification information of authentication server 300, is set by the user and stored in HDD 115 at the stage when the coordination program upon printing is installed in MFP 100. If the authentication by authentication server 300 is successful, authentication portion 57 authenticates the user who is operating operation panel 160 and outputs the user identification information for identifying the authenticated user to extracting portion 59.

In response to the inputting of the user identification information from authentication portion 57, extracting portion 59 extracts the print data associated with the user identification information inputted from authentication portion 57 from the print data stored in HDD 115 by temporary storage portion 53. More specifically, extracting portion 59 extracts the print command including the user identification information inputted from authentication portion 57 from the print commands stored in HDD 115 and obtains one or more print data included respectively in one or more print commands extracted. When there are a plurality of print commands being stored which include the user identification information inputted from authentication portion 57, extracting portion 59 extracts all of the plurality of print commands. Extracting portion 59 outputs one or more print commands obtained to selecting portion 61.

When one or more print commands are inputted from extracting portion 59, selecting portion 61 displays on display portion 161 a selection screen that allows selection of one or more print data respectively included in one or more print commands. Selecting portion 61 selects one from one or more print data according to the operation inputted into operation portion 163 by the user. Selecting portion 61 outputs the print data selected by the user and the print condition included in the print command including that print data to image forming control portion 63 as well as outputs the print command including the selected print data to remote control operation portion 65.

When the print data and the print condition are inputted from selecting portion 61, image forming control portion 63 controls image forming portion 140 to form an image of the print data according to the print condition.

When the print command is inputted from selecting portion 61, remote control operation portion 65 specifies the apparatus which has transmitted that print command. More specifically, since the sets of the print commands and the apparatus identification information are stored in HDD 115 by temporary storage portion 53, remote control operation portion 65 obtains the apparatus identification information which forms a set with the print command inputted from selecting portion 61.

Remote control operation portion 65 includes a remote control operation transmission portion 67 and a screen display control portion 69. When a print command is inputted from selecting portion 61, remote control operation transmission portion 67 transmits via communication I/F portion 112 a remote control operation command including application identification information included in the print command to the apparatus specified by the apparatus identification information that forms a set with the print command among PCs 200, 200A, and 200B. The remote control operation command including the application identification information is a remote control operation command specifying data to be an object of processing. Here, the case in which the print command transmitted from PC 200 is selected will be described as an example. As described above, in PC 200 receiving the remote control operation command specifying data to be the object of processing, an application program is executed with the application data specified by the application identification information as the object of processing, and the generated screen is transmitted back as a remote control operation screen.

After remote control operation transmission portion 67 transmits the remote control operation command to PC 200, when communication I/F portion 112 receives the remote control operation screen from PC 200, screen display control portion 69 obtains the received remote control operation screen and displays the remote control operation screen on display portion 161.

When the remote control operation screen is displayed on display portion 161 by screen display control portion 69, it becomes possible for the user of MFP 100 to input an operation according to the remote control operation screen into operation portion 163. While the remote control operation screen is being displayed on display portion 161 by screen display control portion 69, remote control operation transmission portion 67 accepts the operation inputted into operation portion 163 by the user as a remote control operation. Remote control operation transmission portion 67 transmits via communication I/F portion 112 a remote control operation command including the operation identification information for identifying the operation accepted from operation portion 163 to PC 200 which had transmitted the remote control operation command specifying data to be the object of processing earlier.

The remote control operation command including the operation identification information is a remote control operation command specifying a process. As described above, in PC 200 receiving the remote control operation command specifying the process, the process corresponding to the operation specified by the operation identification information included in the remote control operation command is executed to generate a screen, and the remote control operation screen is transmitted back.

After remote control operation transmission portion 67 transmits the remote control operation command to PC 200, when communication I/F portion 112 receives the remote control operation screen from PC 200, screen display control portion 69 obtains the received remote control operation screen and displays the remote control operation screen on display portion 161.

Figure 7:
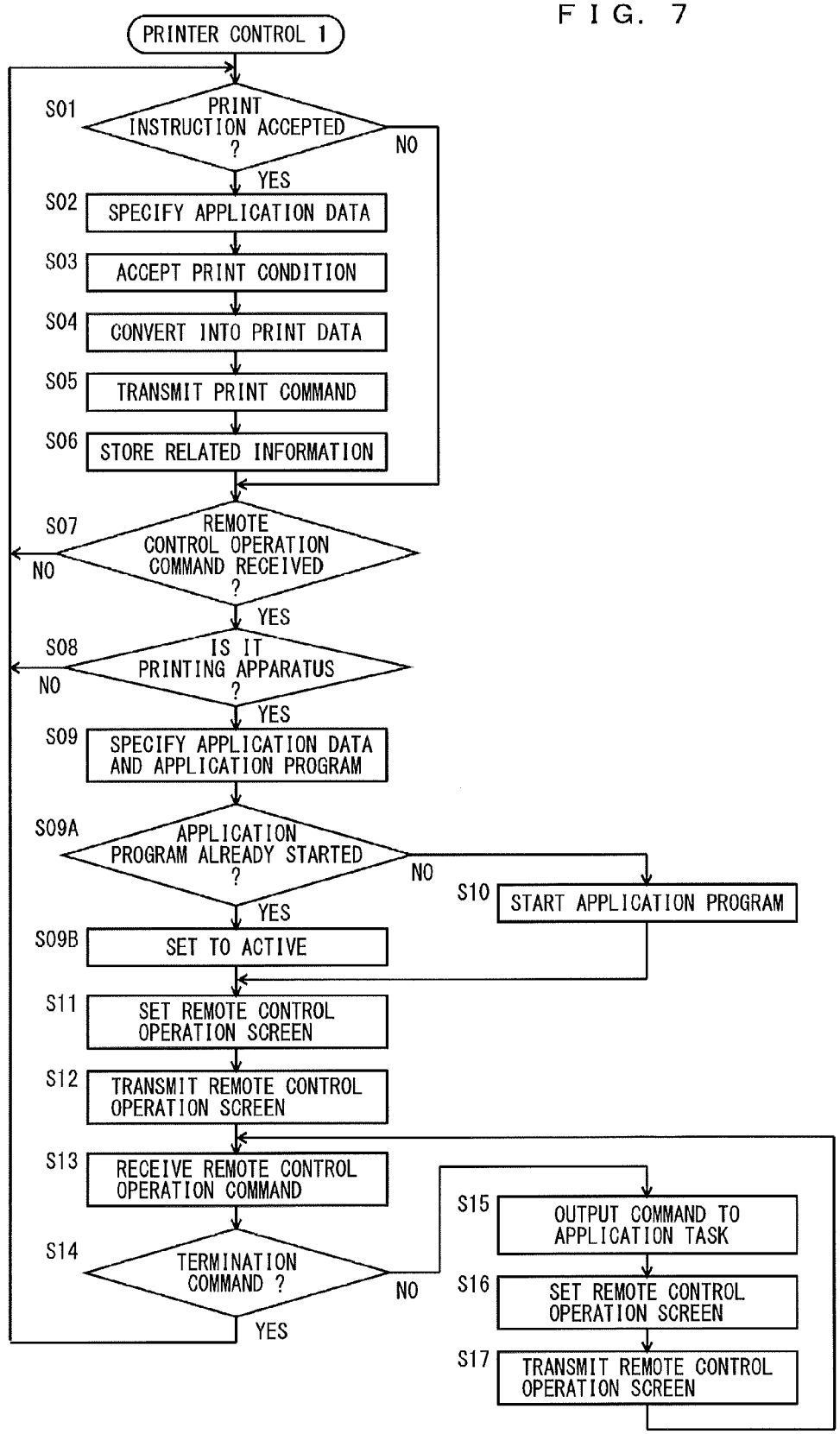
FIG. 7 is a flow chart showing one example of the flow of a printer control process.

FIG. 7 is a flow chart showing one example of the flow of a printer control process. The printer control process is a process executed by CPU 201 when CPU 201 provided in each of PCs 200, 200A, and 200B executes a printer driver program stored in ROM 202, HDD 205, or CD-ROM 209A. Here, the case in which CPU 201 of PC 200 executes the printer control process will be described as an example. Moreover, in the stage prior to PC 200 starting the printer control process, the user has been authenticated by CPU 201, the application program has been executed, and the application data has been generated. Here, the case where the creation and the transmission and reception of electronic mail and the application program for viewing the electronic mail (hereinafter referred to as "electronic mail application") are being executed will be described as an example.

With reference to FIG. 7, CPU 201 determines whether a print instruction has been accepted or not (step S01). The print instruction is accepted if the user inputs the print instruction into operation portion 207. If the print instruction has been accepted, the process proceeds to a step S02, but if not, the process proceeds to a step S07. In other words, the printer control process is a process executed on the condition that the print instruction is inputted by the user in the middle of the execution of the application program by CPU 201.

In step S02, the application data is specified. The data set to be the object of processing by the task executing the application program at the time when the print instruction is accepted is specified to be the application data. Here, the case will be described as an example where the operation which instructs printing is accepted while a received electronic mail is being displayed by the electronic mail application executed by CPU

201. In this case, the electronic mail being the object of display is specified as the application data.

In the next step S03, the print condition is accepted. A setting screen for setting the print condition is displayed on display portion 206, and the print condition is accepted according to the operation inputted into the setting screen by the user. The print condition includes the condition specifying a printing apparatus to print an image of the application data from among MFPs 100, 100A, and 100B. In addition, the print condition includes the number of sheets of image to be formed, the size of a sheet of paper, the distinction between color and black-and-white, a print layout, and so on.

In the next step S04, the application data specified in step S02 is converted into print data and the process proceeds to a step S05. In step S05, a print command is transmitted to a printing apparatus. More specifically, the print command is transmitted via network I/F 204 to the apparatus designated to be the printing apparatus in step S03 among MFPs 100, 100A, and 100B, or here, to MFP 100. The print command includes the user identification information of the user authenticated by CPU 201, the print data converted from the application data in step S04, the print condition accepted in step S03, and the application identification information for identifying the application data specified in step S02.

In a step S06, related information is stored in HDD 205 and the process proceeds to step S07. The related information includes the application identification information for identifying the application data specified in step S02, the program identification information for identifying the electronic mail application executed by CPU 201, and the apparatus identification information for identifying MFP 100 designated to be the printing apparatus in step S03.

In step S07, it is determined whether a remote control operation command has been received or not. It is determined whether network I/F 204 has received the remote control operation command from one of MFPs 100, 100A, and 100B or not. If the remote control operation command had been received, the process proceeds to a step S08, but if not, the process goes back to step S01.

In step S08, it is determined whether or not the apparatus that has transmitted the remote control operation command is the apparatus that has transmitted the print command. More specifically, from the related information stored in HDD 205, the related information including the application identification information included in the remote control operation command received in step S07 is extracted. Then, the apparatus identification information of the apparatus that has transmitted the remote control operation command is compared with the apparatus identification information included in the extracted related information. If they are identical, the apparatus that has transmitted the remote control operation command is determined to be the apparatus that has transmitted the print command, but if they are not identical, the apparatus that has transmitted the remote control operation command is determined not to be the apparatus that has transmitted the print command. The process proceeds to a step S09 if the apparatus that has transmitted the remote control operation command is determined to be the apparatus that has transmitted the print command, but if not, the process goes back to step S01. This is to determine that the user who has instructed the printing at PC 200 is the same as the user who operates PC 200 by remote control by operating MFP 100 serving as the printing apparatus.

In step S09, the application data and the application program are specified, and the process proceeds to a step S09A. These are specified by extracting the related information including the application identification information included in the remote control operation command received in step S07 from the related information stored in HDD 205 and by obtaining the program identification information and the application identification information included in the extracted related information.

In step S09A, it is determined whether the application program specified in step S09 has already been started or not. If the application program specified in step S09 has been started, the process proceeds to a step S09B, but if it has not been started, the process proceeds to a step S10. In step S09B, the task executing the application program specified in step S09 is set to active and the process proceeds to a step S11. More specifically, the task executing the application program specified in step S09 is set to a state that allows inputting and outputting of data, and the application data specified by the application identification information obtained in step S09 is processed.

On the other hand, in step S10, the application program specified in step S09 is started and the process proceeds to step S11. The application program specified by the program identification information obtained in step S09 is executed, and the application data specified by the application identification information obtained in step S09 is processed.

In step S11, a remote control operation screen is set. The screen generated when the task executing the application program processes the application data is set to be the remote control operation screen by CPU 201. Here, the application program is to be the electronic mail application and the application data is to be an electronic mail so that the screen displaying the electronic mail is set to be the remote control operation screen.

In the next step S12, the remote control operation screen is transmitted via network I/F 204 to the apparatus that has transmitted the remote control operation command, or here, to MFP 100. Consequently, the remote control operation screen is displayed on MFP 100, and the user operating MFP 100 is able to view on display portion 161 of MFP 100 the same screen as the screen that had been displayed on PC 200 at the time the electronic mail was printed on PC 200.

Furthermore, the screen displayed on display portion 161 of MFP 100 is a screen for operating PC 200 by remote control so that if the user inputs a remote control operation into MFP 100, MFP 100 transmits the remote control operation command to PC 200.

In a step S13, the remote control operation command is received from MFP 100 that has transmitted the remote control operation screen in step S12. Then, in a step S14, it is determined whether the remote control operation command received in step S13 is a termination command or not. If it is a termination command, the process goes back to step S01, but if not, the process proceeds to a step S15.

In step S15, a command is outputted to cause the task executing the application program started in step S10 to execute the processing. The command is a command corresponding to the process specified by the operation identification information included in the remote control operation command received in step S13. As a result, the task executing the application program started in step S10 executes the process specified by the command and outputs a screen so that the screen outputted by the task executing the application program is set to be the remote control operation screen (step S16).

Then, the remote control operation screen is transmitted via network I/F 204 to the apparatus that has transmitted the remote control operation command, or here, to MFP 100, and the process proceeds to step S13 (step S17). Consequently, the remote control operation screen is displayed at MFP 100 so that the inputting of the operation from the time of printing the electronic mail on PC 200 can be continued on MFP 100. For instance, PC 200 can be made to execute the process of transferring the electronic mail, the process of transmitting back the electronic mail, the process of saving the electronic mail, and so on.

Figure 8:
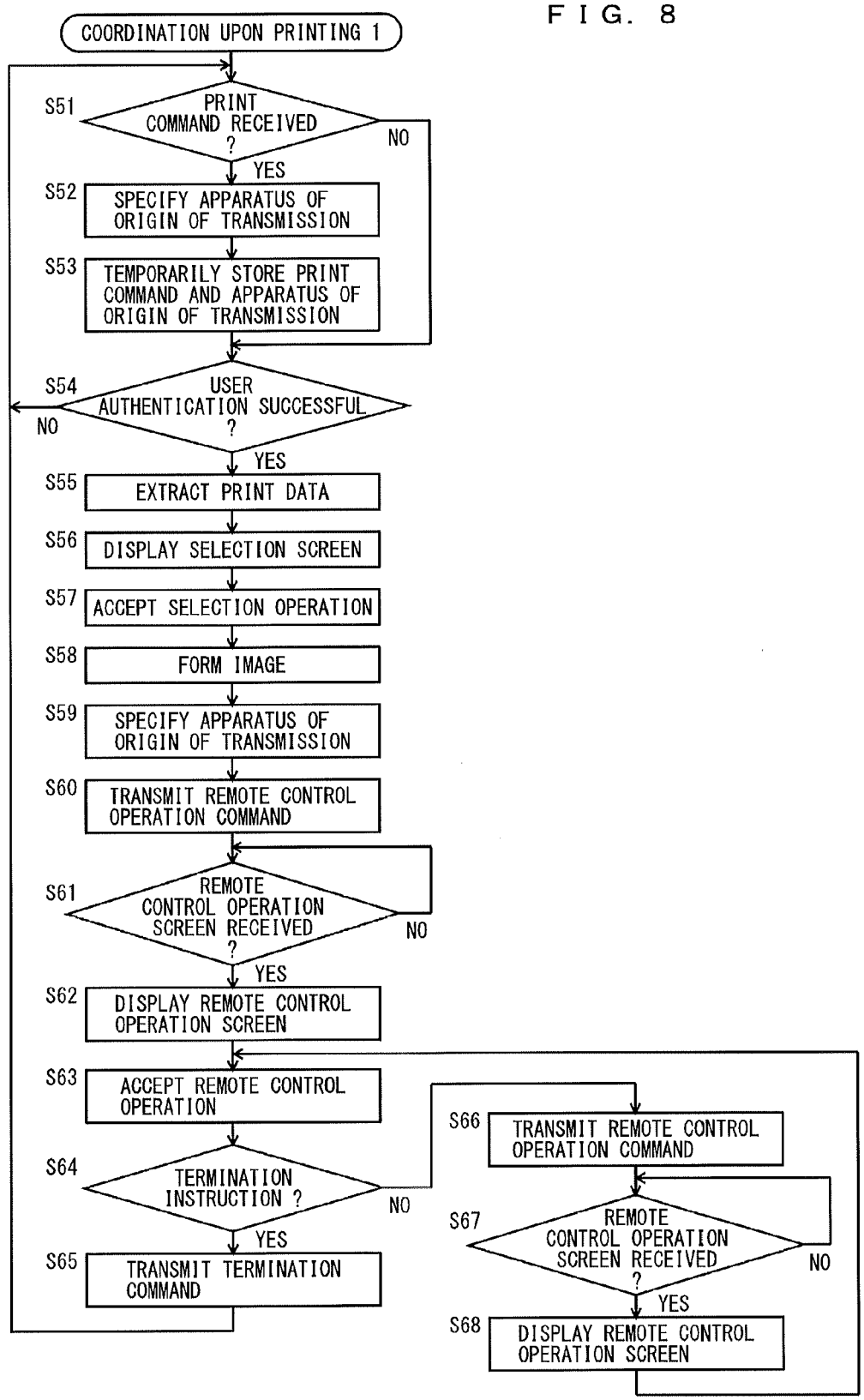
FIG. 8 is a flow chart showing one example of the flow of a coordination process upon printing.

FIG. 8 is a flow chart showing one example of the flow of a coordination process upon printing. The coordination process upon printing is a process executed by CPU 111 when CPU 111 provided in each of MFPs 100, 100A, and 100B executes a coordination program upon printing stored in ROM 113, HDD 115, or CD-ROM 118.

With reference to FIG. 8, CPU 111 determines whether a print command has been received or not (step S51). It is determined whether communication I/F portion 112 has received the print command from one of PCs 200, 200A, and 200B or not. If the print command has been received, the process proceeds to a step S52, but if not, the process proceeds to a step S54. In step S52, the apparatus of the origin of the transmission of the print command is specified. Here, the case in which the print command is received from PC 200 will be described as an example. In a step S53, the print command and the apparatus of the origin of the transmission specified in step S52 are stored temporarily, and the process proceeds to step S54. More specifically, the print command and the apparatus identification information for the apparatus of the origin of the transmission, or here, for PC 200, are stored in HDD 115.

In step S54, it is determined whether the authentication of the user has been successful or not. A log-in screen is displayed on display portion 161, and the authentication is determined to have succeeded or not, based on the user identification information and a password inputted into operation portion 163 by the user. If the authentication of the user has been successful, the process proceeds to a step S55, but if not, the process goes back to step S51.

In step S55, the print data which the user who was authenticated in step S54 instructed to print is extracted. More specifically, the print command including the user identification information of the user authenticated in step S54 is extracted from the print commands stored in HDD 115, and one or more print data respectively included in one or more print commands extracted are obtained.

Then, a selection screen is displayed (step S56). The selection screen that allows selection of one or more print data extracted in step S55 is displayed on display portion 161. Thereafter, the operation to select one from one or more print data extracted in step S55 is accepted (step S57). A selection operation of selecting one from one or more print data is accepted according to the operation inputted into operation portion 163 by the user. In the next step S58, an image of the print data selected in step S57 is formed.

In a step S59, the apparatus of the origin of the transmission is specified which has transmitted the print command including the print data whose image had been formed. Here, the case in which the apparatus of the origin of the transmission which has transmitted the print command including the print data whose image had been formed is PC 200 will be described as an example. When stored in HDD 115 in step S53, the print command is stored in association with the apparatus identification information of the apparatus of the origin of the transmission which has transmitted the print command. Thus, in step S59, the apparatus of the origin of the transmission is specified by obtaining the apparatus identification information associated with the print command stored in HDD 115.

In the next step S60, a remote control operation command is transmitted via communication I/F portion 112 to the apparatus of the origin of the transmission, or here, to PC 200. The remote control operation command includes the application identification information included in the print command including the print data whose image had been formed. PC 200 receiving the remote control operation command transmits the screen generated by processing the application data specified by the application identification information as a remote control operation screen. In the next step S61, it is determined whether or not communication I/F portion 112 has received the remote control operation screen from PC 200 which is the apparatus of the origin of the transmission. The process stands by until the remote control operation screen is received, and if the remote control operation screen is received, the process proceeds to a step S62. In step S62, the received remote control operation screen is displayed on display portion 161, and the process proceeds to a step S63.

The screen generated by processing the application data specified by the application identification information in PC 200 is the same screen as the screen displayed on PC 200 at the time the printing of the application data had been instructed. Consequently, the user operating MFP 100 is able to view on display portion 161 of MFP 100 the same screen as the screen that had been displayed on PC 200 at the time the user instructed the printing of the application data on PC 200.

In step S63, a remote control operation is accepted. The operation which the user inputs into operation portion 163 according to the remote control operation screen displayed on display portion 161 is accepted as the remote control operation.

In the next step S64, it is determined whether the operation accepted in step S63 is an operation instructing the termination of the remote control operation or not. If it is a termination instruction, the process proceeds to a step S65, but if not, the process proceeds to a step S66. In step S65, the remote control operation command including the termination instruction is transmitted via communication I/F portion 112 to the apparatus of the origin of the transmission, or here, to PC 200, and the process goes back to step S51.

In step S66, the remote control operation command is transmitted via communication I/F portion 112 to the apparatus of the origin of the transmission, or here, to PC 200. The remote control operation command, here, includes operation identification information for identifying the operation accepted in step S63. PC 200 receiving the remote control operation command transmits the screen generated by executing the process corresponding to the operation specified by the operation identification information included in the remote control operation command as a remote control operation screen. In the next step S67, it is determined whether or not communication I/F portion 112 has received the remote control operation screen from PC 200 which is the apparatus of the origin of the transmission. The process stands by until the remote control operation screen is received, and if the remote control operation screen is received, the process proceeds to a step S68. In step S68, the received remote control operation screen is displayed on display portion 161, and the process goes back to step S63.

Since the remote control operation screen is displayed at MFP 100, the inputting of the operation from the time when the printing of the application data was instructed on PC 200 can be continued on MFP 100. For instance, the case will be described as an example where the user causes PC 200 to execute an electronic mail app, and while the electronic mail is being displayed, the user inputs the print instruction to have the electronic mail printed at MFP 100 and thereafter logs into MFP 100. When the user logs into MFP 100, MFP 100 displays the remote control operation screen at the same time as it starts the image forming of the electronic mail so that the user is able to cause PC 200 to execute the process of transferring the electronic mail, the process of transmitting back the electronic mail, the process of saving the electronic mail, and so on, by controlling PC 200 remotely from MFP 100 while MFP 100 is forming the image of the electronic mail.

Figure 9:
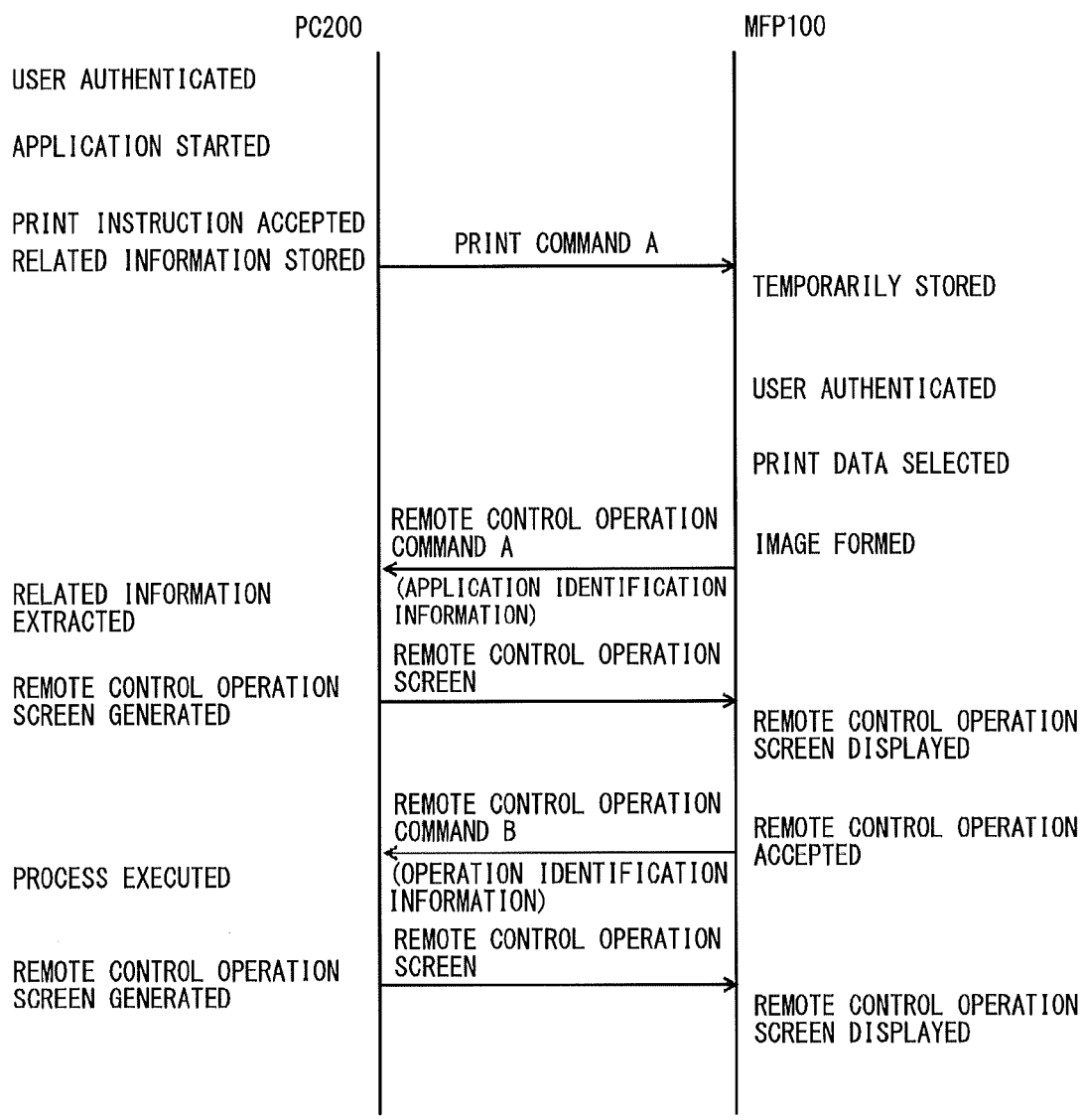
FIG. 9 is a diagram showing one example of the chronological flow of data transmitted and received between the PC and the MFP.

FIG. 9 is a diagram showing one example of the chronological flow of data transmitted and received between the PC and the MFP. In FIG. 9, the chronological flow is shown in the case where the user operates PC 200 and instructs printing at MFP 100. With reference to FIG. 9, the flow of time is indicated from the top toward the bottom, and time axes corresponding to PC 200 and MFP 100 respectively are shown in order from the left-hand side.

First, when the user logs into PC 200, the user is authenticated at PC 200. Then, when the user causes PC 200 to start an application program and inputs a print instruction, PC 200 transmits a print instruction A to MFP 100. The print instruction A includes the application identification information for identifying the application data to be an object of printing. Then, related information is stored. The related information includes the program identification information for identifying the application program, the application identification information for identifying the application data, and the apparatus identification information of MFP 100 at the destination of transmission of print command A.

In MFP 100, when print command A is received, the received print command A is associated with PC 200 and stored temporarily.

Moreover, although the case where print command A is transmitted from one PC 200 to MFP 100 is shown here as an example, the user may transmit a print command A to MFP 100 from each of a plurality of PCs 200, 200A, and 200B. In such a case, MFP 100 stores print command A received from PC 200 in association with PC 200, stores print command A received from PC 200A in association with PC 200A, and stores print command A received from PC 200B in association with PC 200B. In addition, the user may transmit a print command A from PC 200 to one of MFPs 100, 100A, and 100B. In this case, print command A is stored in association with PC 200 in each of MFPs 100, 100A, and 100B.

Next, when the user logs into MFP 100, the user is authenticated at MFP 100. Then, if the user selects one of the print data included in the print command temporarily stored, the image of that print data is formed. Further, MFP 100 transmits a remote control operation command A to PC 200 while the image of the print data is being formed. MFP 100 specifies the destination of transmission of remote control operation command A to be PC 200 which is associated with the print command including the print data selected by the user. In addition, remote control operation command A includes the application identification information included in the print command.

In PC 200 receiving remote control operation command A, the related information including the application identification information included in remote control operation command A is extracted, the determination is made as to whether MFP 100 that has transmitted remote control operation command A is the apparatus that has transmitted print command A or not, and if MFP 100 is the apparatus that has transmitted print command A, a remote control operation screen is generated. The application program and the application data are specified from the related information, and the screen generated when the task which executes the application program processes the application data is set to be the remote control operation screen. Then, the remote control operation screen is transmitted to MFP 100. In MFP 100 receiving the remote control operation screen, the received remote control operation screen is displayed at display portion 161. Consequently, the user operating MFP 100 may operate by remote control PC 200 that has transmitted the print data in the middle of the image forming of the print data. Further, the same screen as the screen that had been displayed on PC 200 at the time the printing of the print data was instructed on PC 200 can be displayed at display portion 161.

Next, in the case where the operation inputted into operation portion 163 of MFP 100 is accepted as a remote control operation, a remote control operation command B is transmitted to PC 200. Remote control operation command B includes operation identification information for identifying the remote control operation. In PC 200 receiving remote control operation command B, the process corresponding to the operation specified by the operation identification information included in remote control operation command B is executed by the task executing the application program, and the screen generated when the task which executes the application program executes the process corresponding to the operation specified by the operation identification information is set to be the remote control operation screen. Then, the remote control operation screen is transmitted to MFP 100. In MFP 100 receiving the remote control operation screen, the received remote control operation screen is displayed at display portion 161. As a result, the user may continue the work that was performed by operating PC 200 by operating MFP 100.

As described above, in print system 1 according to the present embodiment, at the stage where the print command including the application identification information and the print data converted from application data is transmitted to MFP 100, PC 200 stores the related information including the application identification information of the application data and the program identification information of the application program to which the application data is the object of processing. On the other hand, MFP 100 receives a print command from PC 200, and in response to the forming of the image of the print data, transmits a remote control operation command including the application identification information included in the print command to PC 200 that has transmitted the print command, and displays the remote control operation screen received from PC 200. Consequently, on MFP 100, while the image of the print data is being formed, PC 200 that has transmitted the print data can be operated by remote control.

In addition, in response to the remote control operation command being received from MFP 100, PC 200 executes the application program specified by the program identification information associated with the application identification information included in the remote control operation command, and generates and transmits the screen obtained by having processed the application data as the remote control operation screen so that the screen that had been displayed on PC 200 at the time the user instructed the printing of the application data can be viewed at MFP 100.

Moreover, in MFP 100, while the remote control operation screen is being displayed, if an operation is accepted, the screen generated when PC 200 executes the process corresponding to the operation is displayed at MFP 100. Consequently, the process to be executed in PC 200, after the point in time when the user instructed the printing of the application data, can be executed by PC 200 by an operation inputted into MFP 100.

Furthermore, in the case where the print command transmitted from PC 200 to MFP 100 includes the user identification information of the user authenticated by PC 200 and where the same user as the user authenticated by PC 200 is authenticated at MFP 100, it becomes possible to form an image of the print data included in the print command and to operate PC 200 from MFP 100 by remote control while that image is being formed. As a result, the user who is allowed to operate PC 200 by remote control from MFP 100 can be limited to the user who has instructed the printing at PC 200.

First Modification

In the above-described embodiment, the operating user is to be authenticated in each of PCs 200, 200A, and 200B and MFPs 100, 100A, and 100B. A print system 1A according to the first modification is one in which each of PCs 200, 200A, and 200B and MFPs 100, 100A, and 100B does not authenticate the operating user. Consequently, in print system 1A according to the first modification, the user is required to input authentication information when instructing printing at one of PCs 200, 200A, and 200B, and the user is asked to input the same authentication information when printing the print data at one of MFPs 100, 100A, and 100B. Thus, the printing of the print data is allowed on the condition that the user who has instructed the printing at one of PCs 200, 200A, and 200B is the same as the user who instructs printing at one of MFPs 100, 100A, and 100B.

Print system 1A according to the first modification will be described below with main focus on where it differs from the above-described print system 1.

Figure 10:
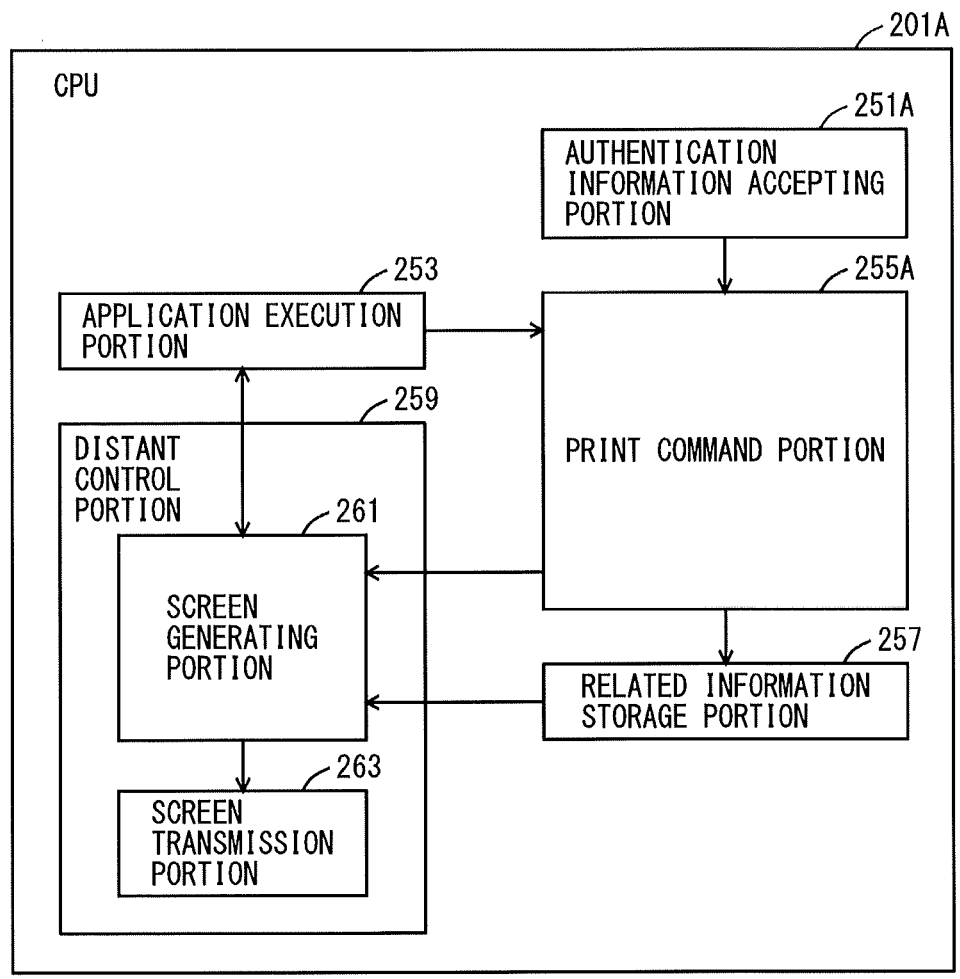
FIG. 10 is a block diagram showing one example of a function of a CPU provided in a PC according to a modification.

FIG. 10 is a block diagram showing one example of a function of a CPU provided in a PC according to a modification. The function of CPU 201A provided in PC 200 according to the modification shown in FIG. 10 differs from the function of CPU 201 provided in PC 200 shown in FIG. 5 in that user authentication portion 251 has been deleted, that an authentication information accepting portion 251A has been added, and that print command portion 255 has been changed to a print command portion 255A. Other functions are the same as the functions shown in FIG. 5 so that the description will not be repeated here.

To print command portion 255A, program identification information and application data are inputted from application execution portion 253. Print command portion 255A displays a setting screen for setting a print condition on display portion 206 and accepts the print condition according to the operation the user inputs into the setting screen. In addition, print command portion 255A outputs an authentication information obtainment request to authentication information accepting portion 251A.

In response to the input of the authentication information obtainment request from print command portion 255A, authentication information accepting portion 251A displays an authentication information accepting screen on display portion 206 and accepts the authentication information which the user inputs into operation portion 207 according to the authentication information accepting screen. The authentication information is, for instance, a password. Authentication information accepting portion 251A outputs the accepted authentication information to print command portion 255A.

When the authentication information is inputted from authentication information accepting portion 251A, print command portion 255A generates a print command including that authentication information, print data converted from application data, a print condition, and application identification information for identifying the application data. Then, print command portion 255A transmits the generated print command via network I/F 204 to MFP 100 serving as the printing apparatus.

Figure 11:
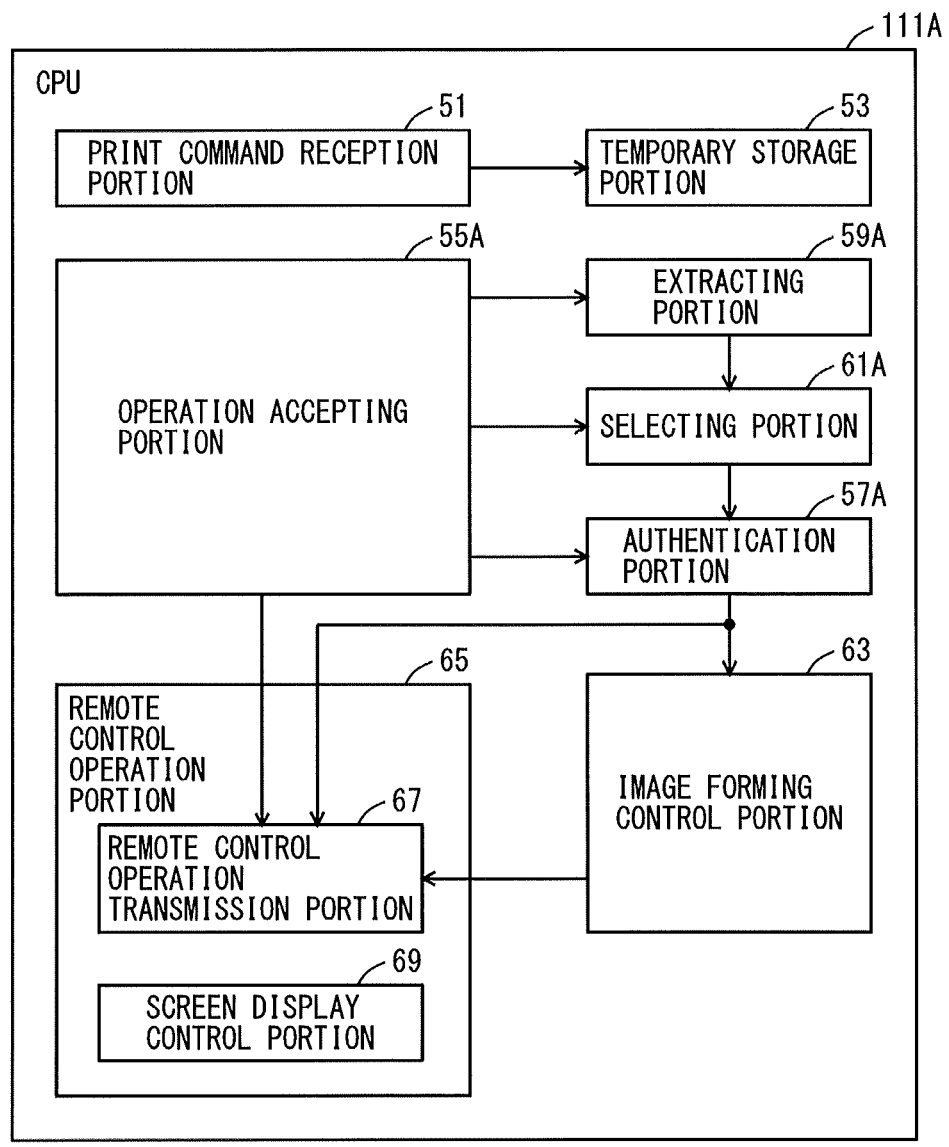
FIG. 11 is a block diagram showing one example of a function of a CPU provided in an MFP according to the modification.

FIG. 11 is a block diagram showing one example of a function of a CPU provided in an MFP according to the modification. With reference to FIG. 11, the functions differ from those shown in FIG. 6 in that operation accepting portion 55, authentication portion 57, extracting portion 59, and selecting portion 61 have respectively been changed to an operation accepting portion 55A, an authentication portion 57A, an extracting portion 59A, and a selecting portion 61A. Other functions are the same as the functions shown in FIG. 6 so that the description will not be repeated here.

Operation accepting portion 55A accepts the operation inputted into operation portion 163. Operation accepting portion 55A outputs the operation accepted at the stage where a BOX selection screen is being displayed on display portion 161 to extracting portion 59A, outputs the operation accepted at the stage where a selection screen is being displayed on display portion 161 to selecting portion 61A, outputs the operation accepted at the stage where an authentication information accepting screen is being displayed on display portion 161 to authentication portion 57A, and outputs the operation accepted at the stage where a remote control operation screen is being displayed on display portion 161 to remote control operation portion 65.

If the user operates operation portion 163 to input the operation to select a BOX at the stage where the BOX selection screen is being displayed on display portion 161, extracting portion 59A extracts the print data stored in the BOX selected by the user. The BOX is a plurality of storage areas provided in HDD 115. Here, temporary storage portion 53 stores a print command in a predetermined BOX among the plurality of BOXes provided in HDD 115. Consequently, when the user selects in the BOX selection screen the BOX in which a print command is stored, extracting portion 59A extracts all of the print commands stored in that BOX and outputs all the extracted print commands to selecting portion 61A.

When one or more print commands are inputted from extracting portion 59A, selecting portion 61A displays on display portion 161 a selection screen that allows selection of one or more print data respectively included in one or more print commands. Selecting portion 61A selects one from one or more print data according to the operation inputted into operation portion 163 by the user. Selecting portion 61A outputs the print command including the print data selected by the user to authentication portion 57A.

When the print command is inputted from selecting portion 61A, authentication portion 57A displays the authentication information accepting screen on display portion 161 and accepts the authentication information inputted into operation portion 163 by the user according to the authentication information accepting screen. Authentication portion 57A compares the authentication information included in the print command with the authentication information accepted by operation portion 163, and determines the authentication to be successful when the two match. If the authentication is determined to be successful, authentication portion 57A outputs the print condition and the print data included in the print command to image forming control portion 63 as well as outputs the print command to remote control operation portion 65.

Figure 12:
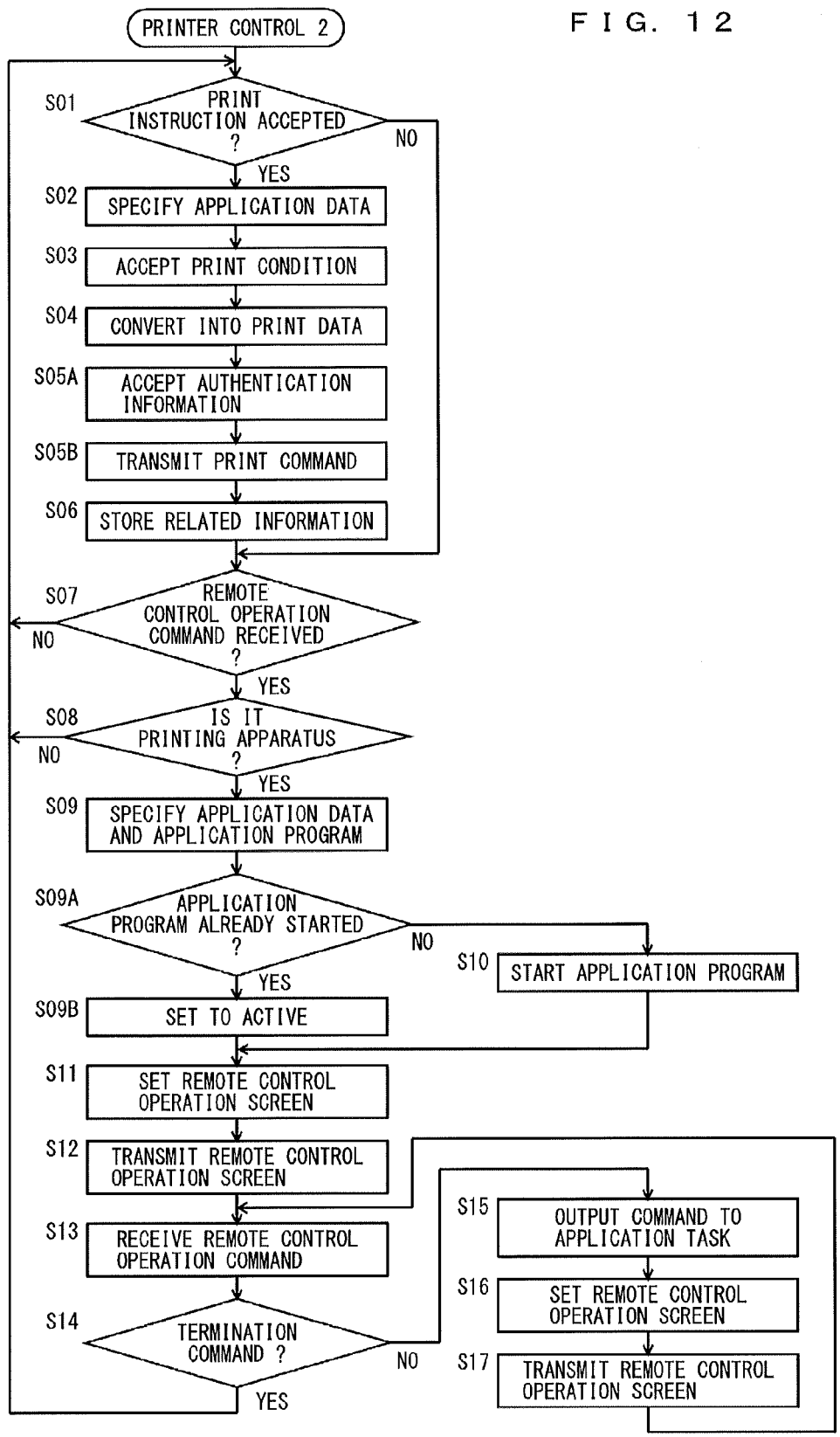
FIG. 12 is a flow chart showing one example of the flow of a printer control process according to the modification.

FIG. 12 is a flow chart showing one example of the flow of a printer control process according to the modification. With reference to FIG. 12, the printer control process differs from that shown in FIG. 7 in that step S05 is changed to a step S05A and a step S05B. Other processing is the same as the printer control process shown in FIG. 7 so that the description will not be repeated here. In the stage prior to PC 200 according to the modification starting the printer control process shown in FIG. 12, the user need not be authenticated by CPU 201, but the application program has been executed and the application data has been generated. Here, the case where the creation and the transmission and reception of electronic mail and the application program for viewing the electronic mail (hereinafter referred to as "electronic mail application") are being executed will be described as an example.

With reference to FIG. 12, in step S05A, the authentication information inputted into operation portion 207 by the user is accepted. An authentication information accepting screen is displayed on display portion 206, and the authentication information which the user inputs into operation portion 207 according to the authentication information accepting screen is accepted. The authentication information is, for instance, a password.

In step S05B, a print command including the authentication information accepted in step S05A, print data converted from application data, a print condition, and application identification information for identifying the application data. Then, the generated print command is transmitted via network I/F 204 to MFP 100 serving as the printing apparatus.

Figure 13:
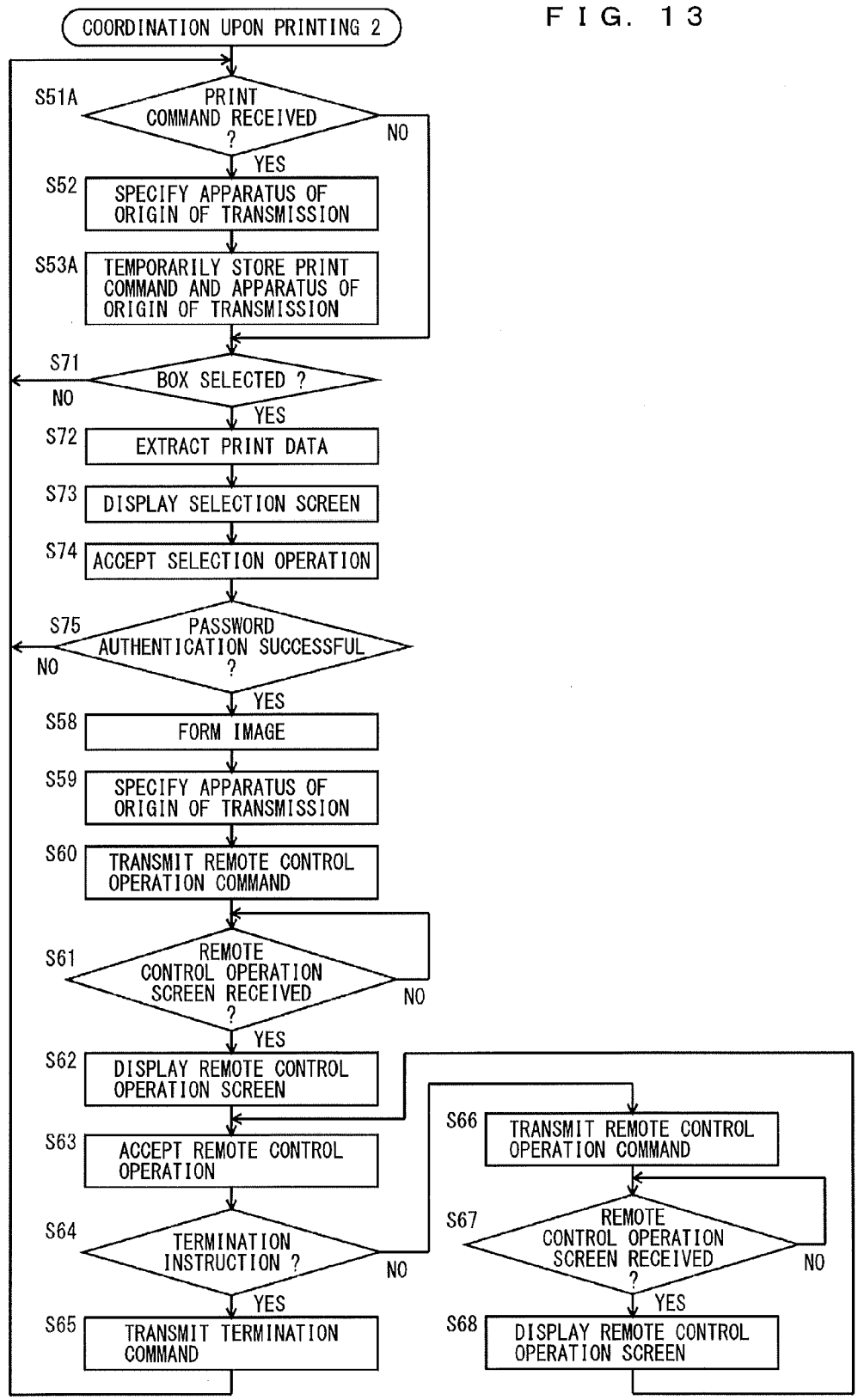
FIG. 13 is a flow chart showing one example of the flow of a coordination process upon printing according to the modification.

FIG. 13 is a flow chart showing one example of the flow of a coordination process upon printing according to the modification. With reference to FIG. 13, the coordination process upon printing differs from that shown in FIG. 8 in that step S51 and step S53 have been changed to a step S51A and a step S53A and that step S54 through step S57 have been replaced by a step S71 through a step S75. Other processing is the same as that shown in FIG. 8 so that the description will not be repeated here.

In step S51A, it is determined whether a print command has been received or not. It is determined whether communication I/F portion 112 has received the print command from one of PCs 200, 200A, and 200B or not. If the print command has been received, the process proceeds to step S52, but if not, the process proceeds to step S71. The print command to be received here includes print data, a print condition, application identification information, and authentication information.

In step S52, the apparatus of the origin of the transmission of the print command is specified. Here, the case in which the print command is received from PC 200 will be described as an example. In step S53A, the print command and the apparatus of the origin of the transmission specified in step S52 are stored temporarily, and the process proceeds to step S71. More specifically, the print command and the apparatus identification information for the apparatus of the origin of the transmission, or here, for PC 200, are stored in a predetermined BOX among a plurality of BOXes provided in HDD 115.

In step S71, it is determined whether a BOX has been selected by the user or not. It is determined whether the BOX predetermined to store the print command is selected from among a plurality of BOXes provided in HDD 115 or not. If the BOX in which the print command is stored has been selected, the process proceeds to a step S72, but if not, the process goes back to step S51A.

In a step S72, the print data is extracted. More specifically, from the print commands stored in HDD 115, the print data stored in the BOX selected in step S71 is extracted. Consequently, the print command received in step S51A is extracted, and one or more print data respectively included in one or more print commands extracted are obtained.

Then, a selection screen is displayed (step S73). The selection screen that allows selection of one or more print data extracted in step S72 is displayed on display portion 161. Then, in a step S74, the operation to select one from one or more print data is accepted. A selection operation of selecting one from one or more print data is accepted according to the operation inputted into operation portion 163 by the user. In the next step S75, it is determined whether a password authentication has been successful or not. An authentication information accepting screen is displayed on display portion 161, and the authentication information which the user inputs into operation portion 163 according to the authentication information accepting screen is accepted. Then, the authentication information included in the print command including the print data selected in step S74 is compared with the accepted authentication information, and the password authentication is determined to have been successful if the two match. If the password authentication has been successful, the process proceeds to step S58, but if not, the process goes back to step S51A.

In the next step S58, an image of the print data selected in step S74 is formed, and the process proceeds to step S59.

Figure 14:
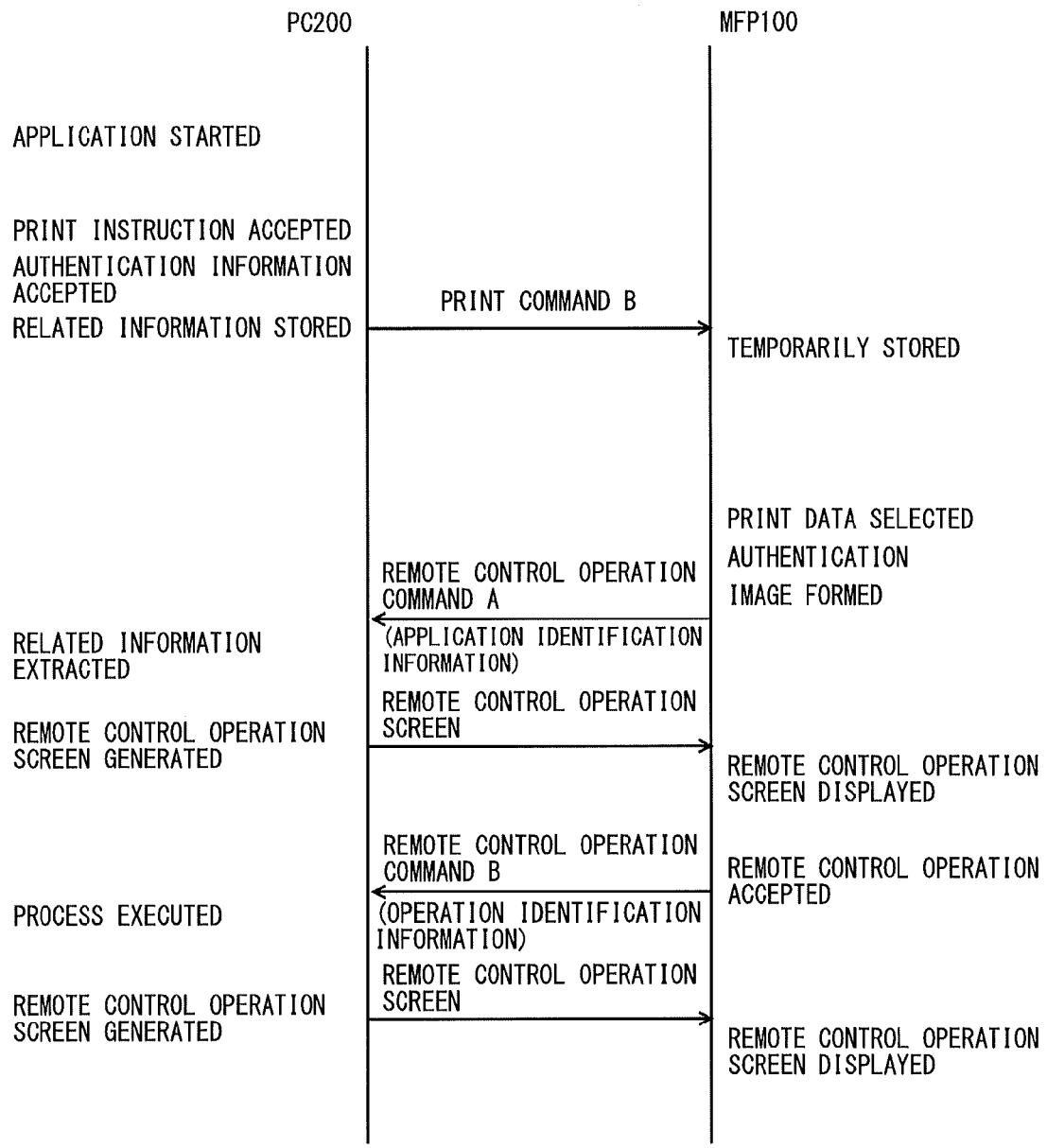
FIG. 14 is a diagram showing one example of the chronological flow of data transmitted and received between the PC and the MFP according to the modification.

FIG. 14 is a diagram showing one example of the chronological flow of data transmitted and received between the PC and the MFP according to the modification. In FIG. 14, the chronological flow is shown in the case where the user operates PC 200 and instructs printing at MFP 100. With reference to FIG. 14, the flow of time is indicated from the top toward the bottom, and time axes corresponding to PC 200 and MFP 100 respectively are shown in order from the left-hand side.

First, when the user operates PC 200 to cause PC 200 to start an application program and inputs a print instruction, PC 200 receives the authentication information inputted by the user and transmits a print instruction B to MFP 100. The print instruction B includes the authentication information and the application identification information for identifying the application data to be the object of printing. Then, related information is stored. The related information includes the program identification information for identifying the application program, the application identification information for identifying the application data, and the apparatus identification information of MFP 100 at the destination of transmission of print command B.

In MFP 100, when print command B is received, the received print command B is associated with PC 200 and stored temporarily in a predetermined BOX.

Next, if the user operates MFP 100 and instructs on the BOX in which the print data is stored, a selection screen for selecting the print data stored in the BOX is displayed at MFP 100. The selection screen includes a list of names of the print data. Then, if the user selects one of the print data included in the print command temporarily stored, the authentication information is accepted, and the determination is made as to whether the operation of selecting the print data is an authentic operation or not. If the accepted authentication information matches the authentication information included in the print command including the selected print data, the operation is determined to be authentic. Then, if the operation is determined to be authentic, the image of the selected print data is formed.

Further, MFP 100 transmits remote control operation command A to PC 200 while the image of the print data is being formed. The processing that follows is the same as the processing shown in FIG. 9 so that the description will not be repeated here.

In print system 1A according to the first modification, the print command transmitted from PC 200 to MFP 100 includes the authentication information inputted by the user operating PC 200, the image of the print data included in the print command is formed if the same authentication information as the authentication information inputted in PC 200 is inputted in MFP 100, and PC 200 can be operated by remote control from MFP 100 while that image is being formed. As a result, the user who is allowed to operate PC 200 by remote control from MFP 100 can be limited to the user who had inputted the authentication information in PC 200.

Moreover, although the case where print command B is transmitted from one PC 200 to MFP 100 is shown here as an example, the user may transmit a print command B to MFP 100 from each of a plurality of PCs 200, 200A, and 200B. In such a case, MFP 100 stores print command B received from PC 200 in association with PC 200, stores print command B received from PC 200A in association with PC 200A, and stores print command B received from PC 200B in association with PC 200B. In addition, the user may transmit a print command B from PC 200 to one of MFPs 100, 100A, and 100B. In this case, print command B is stored in association with PC 200 in each of MFPs 100, 100A, and 100B.

Second Modification

While the print data is to be stored temporarily in MFPs 100, 100A, and 100B in the above-described embodiment, a print server may be provided and each of PCs 200, 200A, and 200B may have the print server store the print data temporarily. In this case, upon the installation of a driver program for pull-printing in each of PCs 200, 200A, and 200B, the print server is registered as a destination of transmission of the print data. For instance, the print server is registered by setting the network address for the print server.

By executing the driver program for pull-printing, each of PCs 200, 200A, and 200B causes one of MFPs 100, 100A, and 100B to print the print data. More specifically, in the case where a user A logs in at PC 200 by the user identification information "tarol" and instructs the printing of the data designated by user A, for instance, the driver program for pull-printing transmits pull-print data to the print server. The pull-print data includes the user identification information "tarol" and the print data obtained by converting the data designated by the user into a format for printing.

When the print server receives the pull-print data including the user identification information and the print data from one of PCs 200, 200A, and 200B, it temporarily stores the user identification information in association with the print data. Thereafter, if user A of the user identification information "tarol" logs in at one of MFPs 100, 100A, and 100B, or if user A logs in at MFP 100, for instance, MFP 100 transmits an obtainment request including the user identification information "tarol" of user A to the print server. The print server, having received the obtainment request, transmits the print data associated with the user identification information "tarol" included in the obtainment request from among the temporarily stored print data to MFP 100 that has transmitted the obtainment request. MFP 100 prints the print data received from the print server.

Although print systems 1 and 1A are described in the above-described embodiments, the present invention can be construed as a coordination method upon printing which causes MFPs 100, 100A, and 100B to execute the process shown in FIG. 8 or in FIG. 13, and as a coordination program upon printing which causes CPU 111 controlling MFPs 100, 100A, and 100B to execute that coordination method upon printing.

APPENDIX (1) The print system according to claim 4, wherein said print command portion transmits to said image forming apparatus a print command including said print data and user identification information for identifying a user operating said information processing apparatus, said authentication portion includes an operating user specifying portion to specify the user who inputs an operation into said operation accepting portion as an operating user and determines the operation accepted by said operation accepting portion to be authentic if said operating user is specified by said operating user specifying portion, and said extracting portion extracts from said application data stored temporarily the print data which forms a set with the user identification information that is the same as the user identification information of the operating user specified by said operating user specifying portion.

(2) The print system according to claim 4, wherein said print command portion transmits to said image forming apparatus a print command including said print data and authentication information, and said authentication portion determines the operation accepted by said operation accepting portion to be authentic if the authentication information accepted by said operation accepting portion is the same as the authentication information which forms a set with the print data by said print command.

(3) The print system according to claim 4, wherein said temporary storage portion stores said application data received in a temporary storage area to which authentication information is assigned in advance, said authentication portion determines the operation accepted by said operation accepting portion to be authentic if the authentication information accepted by said operation accepting portion is the same as the authentication information assigned to said temporary storage area, and said extracting portion extracts the application data stored temporarily in said temporary storage area.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A print system comprising an image forming apparatus and an information processing apparatus, wherein said information processing apparatus includes a first processor configured to:

generate application data by executing an application program;

transmit to said image forming apparatus a print command including application identification information for identifying said application data and print data converted from said application data in order to cause said image forming apparatus to form an image of said application data generated, by executing a driver program for controlling said image forming apparatus;

store related information related to said application data in association with said application data at a stage where said print data is transmitted by said first processor; and be operated by remote control by said image forming apparatus that has received said print command, and wherein said image forming apparatus includes a second processor configured to:

receive said print command from said information processing apparatus;

store a set of application identification information temporarily and print data included in said received print command;

accept an operation by a user;

extract print data to be an object of processing from said print data stored temporarily based on said accepted operation;

form an image of said extracted print data;

operate by remote control said information processing apparatus that has transmitted said print data in response to the forming of the image of said print data;

transmit to said information processing apparatus a first remote control operation command including application identification information which forms a set with said print data; and display a remote control operation screen received from said information processing apparatus in response to the transmission of said first remote control operation command, and wherein said first processor of said information processing apparatus is further configured to:

generate said remote control operation screen based on said related information associated with the application identification information included in said first remote control operation command, in response to said first remote control operation command being received from said image forming apparatus; and transmit said remote control operation screen to said image forming apparatus.

2. The print system according to claim 1, wherein said related information includes program identification information for identifying an application program executed by said first processor that generated said application data, said first processor is configured to execute the application program specified by the program identification information included in said related information, and said second processor is configured to set the screen which is generated by said first processor with said application data as an object of processing to be a remote control operation screen.

3. The print system according to claim 1, wherein said second processor transmits to said information processing apparatus a second remote control operation command including operation identification information for identifying an operation accepted by said second processor while said remote control operation screen is being displayed, and when said second remote control operation command is received from said image forming apparatus that has transmitted said remote control operation screen, said second processor is configured to cause said first processor to operate according the operation specified by the operation identification information included in said received second remote control operation command and is further configured to set the screen which is generated by said first processor executing a process according to said received second remote control operation command to be a remote control operation screen.

4. The print system according to claim 1, wherein said second processor is further configured to determine whether an operation accepted by said second processor is an authentic operation or not based on authentication information accepted by said second processor, and said second processor forms an image of said print data on the condition that said accepted operation is determined to be authentic by said second processor.

5. The print system according to claim 1, wherein said second processor is further configured to select one from a plurality of extracted print data in a case where said second processor extracts a plurality of said print data, said second processor is configured to form an image of said print data selected, and in response to the image of said print data selected being formed, said second processor is configured to operate by remote control said information processing apparatus that has transmitted the print command including said print data selected.

6. An image forming apparatus controlled by an information processing apparatus, the image forming apparatus comprising a processor configured to:

receive a print command including application identification information for identifying application data generated by said information processing apparatus executing an application program and print data for forming an image of said application data;

store a set of application identification information temporarily and print data included in said received print command;

accept an operation by a user;

extract print data to be an object of processing from said print data stored temporarily, based on said accepted operation;

form an image of said extracted print data;

operate by remote control said information processing apparatus that has transmitted said print data in response to the forming of the image of said print data;

transmit to said information processing apparatus a first remote control operation command including application identification information which forms a set with said print data; and display a remote control operation screen which is received from said information processing apparatus in response to the transmission of said first remote control operation command and which said information processing apparatus generates in relation to application data of the application identification information included in said first remote control operation command.

7. The image forming apparatus according to claim 6, wherein said remote control operation screen includes a screen which is generated by said information processing apparatus executing an application program corresponding to said application data with said application data as an object of processing.

8. The image forming apparatus according to claim 6, wherein said processor is configured to transmit to said information processing apparatus a second remote control operation command including operation identification information for identifying an operation accepted by said processor while said remote control operation screen is being displayed, and said processor is configured to receive a remote control operation screen which is generated and transmitted back by executing a process according to said received second remote control operation command, by said information processing apparatus which has received said second remote control operation command executing the application program corresponding to said application data.

9. The image forming apparatus according to claim 6, wherein the processor is further configured to determine whether an operation accepted by said processor is an authentic operation or not based on authentication information accepted by said processor, and said processor is configured to form an image of said print data on the condition that said accepted operation is determined to be authentic by said processor.

10. The image forming apparatus according to claim 6, wherein the processor is further configured to select one from a plurality of extracted print data in a case where said processor extracts a plurality of said print data, said processor is configured to form an image of said print data selected, and in response to the image of said print data selected being formed, said processor is configured to operate by remote control said information processing apparatus that has transmitted the print command including said print data selected.

11. A coordination method upon printing executed by an image forming apparatus controlled by an information processing apparatus, comprising:

a print command receiving step to receive a print command including application identification information for identifying application data generated by said information processing apparatus executing an application program and print data for forming an image of said application data;

a temporarily storing step temporarily to store a set of application identification information and print data included in said print command received;

an operation accepting step to accept an operation by a user;

an extracting step to extract print data to be an object of processing from said print data stored temporarily, based on the operation accepted in said operation accepting step;

an image forming control step to form an image of said print data extracted; and a remote control operation step to operate by remote control said information processing apparatus that has transmitted said print data in response to the forming of the image of said print data, wherein said remote control operation step includes a remote control operation transmitting step to transmit to said information processing apparatus a remote control operation command including application identification information which forms a set with said print data, and a screen display control step to display a remote control operation screen which is received from said information processing apparatus in response to the transmission of said remote control operation command and which said information processing apparatus generates in relation to application data of the application identification information included in said remote control operation command.

12. The coordination method upon printing according to claim 11, wherein said remote control operation screen includes a screen which is generated by said information processing apparatus executing an application program corresponding to said application data with said application data as an object of processing.

13. The coordination method upon printing according to claim 11, wherein said remote control operation transmitting step includes transmitting to said information processing apparatus a remote control operation command including operation identification information for identifying an operation accepted in said operation accepting step while said remote control operation screen is being displayed, and said screen display control step includes receiving a remote control operation screen which is generated and transmitted back by executing a process according to said remote control operation command received, by said information processing apparatus which has received said remote control operation command executing the application program corresponding to said application data.

14. The coordination method upon printing according to claim 11, further including an authenticating step to determine whether an operation accepted in said operation accepting step is an authentic operation or not based on authentication information accepted in said operation accepting step, wherein said image forming control step includes forming an image of said print data on the condition that said operation accepted is determined to be authentic in said authenticating step.

15. The coordination method upon printing according to claim 11, further including a selecting step to select one from a plurality of print data extracted in a case where a plurality of said print data are extracted in said extracting step, wherein said image forming control step includes forming an image of said print data selected, and in response to the image of said print data selected being formed, said remote control operation step includes operating by remote control said information processing apparatus that has transmitted the print command including said print data selected.

16. A non-transitory computer-readable recording medium encoded with a coordination program upon printing which is executed by a computer controlling an image forming apparatus controlled by an information processing apparatus and which causes said computer to execute:

a print command receiving step to receive a print command including application identification information for identifying application data generated by said computer executing an application program and print data for forming an image of said application data;

a temporarily storing step temporarily to store a set of application identification information and print data included in said print command received;

an operation accepting step to accept an operation by a user;

an extracting step to extract print data to be an object of processing from said print data stored temporarily, based on the operation accepted in said operation accepting step;

an image forming control step to form an image of said print data extracted; and a remote control operation step to operate by remote control said information processing apparatus that has transmitted said print data in response to the forming of the image of said print data, wherein said remote control operation step includes a remote control operation transmitting step to transmit to said information processing apparatus a remote control operation command including application identification information which forms a set with said print data, and a screen display control step to display a remote control operation screen which is received from said information processing apparatus in response to the transmission of said remote control operation command and which said information processing apparatus generates in relation to application data of the application identification information included in said remote control operation command.

* * * * *